US012769570B2

(12) United States Patent
Kim et al.

(10) Patent No.: US 12,769,570 B2
(45) Date of Patent: Oct. 20, 2026

(54) VIRTUALIZED SYSTEM ENABLING A GUEST OS TO CONTROL AN I/O DEVICE, AND METHOD OF OPERATING THE SAME

(71) Applicant: SAMSUNG ELECTRONICS CO., LTD., Suwon-si (KR)

(72) Inventors: Minseok Kim, Yongin-si (KR); Jun Kim, Seoul (KR); Onegun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 689 days.

(21) Appl. No.: 17/934,371

(22) Filed: Sep. 22, 2022

(65) Prior Publication Data

US 2023/0185598 A1 Jun. 15, 2023

(30) Foreign Application Priority Data

Dec. 9, 2021 (KR) ........................ 10-2021-0175660
Feb. 17, 2022 (KR) ........................ 10-2022-0020540

(51) Int. Cl.
*G06F 9/455* (2018.01)

(52) U.S. Cl.
CPC ...... *G06F 9/45558* (2013.01); *G06F 9/45545* (2013.01); *G06F 2009/45562* (2013.01); *G06F 2009/45579* (2013.01)

(58) Field of Classification Search
CPC ............. G06F 9/45558; G06F 9/45545; G06F 2009/45562; G06F 2009/45579; G06F 8/76; G06F 9/4411; G06F 2009/45595
See application file for complete search history.

(56) References Cited

U.S. PATENT DOCUMENTS 8,832,688 B2 9/2014 Tang et al.
9,311,127 B2 4/2016 Graham et al.
(Continued)

FOREIGN PATENT DOCUMENTS

JP 2017-507401 A 3/2017
KR 10-1950000 5/2015

OTHER PUBLICATIONS

EESR dated May 3, 2023 in the corresponding EP Application No. 22207329.8.
(Continued)

*Primary Examiner* — Kenneth Tang
(74) *Attorney, Agent, or Firm* — Morgan, Lewis & Bockius LLP

(57) ABSTRACT

A virtualized system includes a processor, a host operating system (OS), at least one guest operating system, a hypervisor, at least one hardware input/output (I/O) device and at least one hardware interface device. The processor provides a function for a virtualization environment. The host operating system runs on the virtualization environment. The at least one guest operating system runs on at least one virtual machine of the virtualization environment. The hypervisor implements the virtualization environment using the function of the processor, and generates and controls the at least one virtual machine of the virtualization environment. The at least one hardware input/output device is controlled by the host operating system and the at least one guest operating system. The at least one hardware interface device supports a communication between the at least one guest operating system and the at least one hardware input/output device.

20 Claims, 14 Drawing Sheets

(56) References Cited

U.S. PATENT DOCUMENTS

| | | | | |
|---|---|---|---|---|
| 9,424,199 | B2 | 8/2016 | Kegel et al. | |
| 9,836,421 | B1 | 12/2017 | Bshara et al. | |
| 10,164,911 | B2 | 12/2018 | Lakshmanan et al. | |
| 10,169,075 | B2 | 1/2019 | Zhang et al. | |
| 10,191,864 | B1 | 1/2019 | Bshara et al. | |
| 10,635,474 | B2 | 4/2020 | Panicker | |
| 10,645,051 | B2 | 5/2020 | Apfelbaum et al. | |
| 2007/0067435 | A1 | 3/2007 | Landis et al. | |
| 2012/0054740 | A1 | 3/2012 | Chakraborty et al. | |
| 2012/0167082 | A1* | 6/2012 | Kumar | G06F 9/45558 718/1 |
| 2016/0077858 | A1* | 3/2016 | Hunter | G06F 13/4221 710/104 |
| 2018/0181420 | A1* | 6/2018 | Kutch | G06F 9/45558 |
| 2018/0293067 | A1 | 10/2018 | Hirshberg | |
| 2021/0165675 | A1 | 6/2021 | Wang et al. | |
| 2021/0303493 | A1 | 9/2021 | Mahalingam et al. | |

OTHER PUBLICATIONS

Office Action dated Aug. 30, 2026 issued in corresponding to Korean Patent Application No. 10-2022-0020540.

* cited by examiner

FIG. 9A

| Offset | RW | Register | Description |
|---|---|---|---|
| 0x0 | R | MagicValue | Magic value. Must be 0x74726976 (a Little Endian equivalent of a "virt" string). |
| 0x4 | R | Version | Device version number. Devices compliant with this specification must return value 0x2. |
| 0x8 | R | Device ID | Virtio Subsystem Device ID. See 5 Device Types for possible value |
| 0xc | R | Vendor ID | Virtio Subsystem Vendor ID. |
| 0x10 | R | Device Features | Flags representing features the device supports. Reading from this register returns 32 consecutive flag bits |
| 0x14 | W | Device Features Sel | Device (host) features word selection. Writing to this register selects a set of 32 device feature bits accessible by reading from the DeviceFeatures register. |
| 0x20 | W | Driver Features | Flags representing device features understood and activated by the driver. Writing to this register sets 32 consecutive flag bits, |
| 0x24 | W | Driver Features Sel | Activated (guest) features word selection. Writing to this register selects a set of 32 activated feature bits accessible by writing to the DriverFeatures register. |
| 0x30 | W | QueueSel | Virtual queue index (first queue is 0). Writing to this register selects the virtual queue |
| 0x34 | R | QueueNumMax | Maximum virtual queue size. Reading from the register returns the maximum size of the queue the device is ready to process or zero (0x0) if the queue is not available. |
| 0x38 | W | QueueNum | Virtual queue size. Queue size is the number of elements in the queue, therefore size of the Descriptor Table and both Available and Used rings. |
| 0x3c | RW | QueueReady | Virtual queue ready bit. Writing one (0x1) to this register notifies the device that the virtual queue is ready to be used |
| 0x50 | W | QueueNotify | Queue notifier. Writing a queue index to this register notifies the device that there are new buffers to process in the queue. |

FIG. 9B

| Offset | RW | Register | Description |
|---|---|---|---|
| 0x60 | R | InterruptStatus | Interrupt status. Reading from this register returns a bit mask of interrupts asserted by the device. An interrupt is asserted if the corresponding bit is set, ie. equals one (1).<br>- Bit 0 \| Used Ring Update This interrupt is asserted when the device has updated the Used Ring in at least one of the active virtual queues.<br>- Bit 1 \| Configuration change This interrupt is asserted when configuration of the device has changed.e |
| 0x64 | W | InterruptACK | Interrupt acknowledge. Writing to this register notifies the device that the Driver finished handling interrupts. Set bits in the value clear the corresponding bits of the InterruptStatus register. |
| 0x70 | RW | Status | Device status. Reading from this register returns the current device status flags. Writing non-zero values to this register sets the status flags, indicating the OS/driver progress. |
| 0x80 | W | QueueDescLow | Virtual queue' s Descriptor Table 64 bit long physical address. Writing to these two registers (lower 32 bits of the address to QueueDescLow, higher 32 bits to QueueDescHigh) |
| 0x84 | W | QueueDescHigh | |
| 0x90 | W | QueueAvailLow | Virtual queue' s Available Ring 64 bit long physical address. Writing to these two registers (lower 32 bits of the address to QueueAvailLow, higher 32 bits to QueueAvailHigh) notifies the device about location of the Available Ring of the queue selected by writing to the QueueSel register. It is allowed only when QueueReady is set to zero (0x0), so when the queue is not in use. |
| 0x94 | W | QueueAvailHigh | |
| 0xA0 | W | QueueUsedLow | Virtual queue' s Used Ring 64 bit long physical address. Writing to these two registers (lower 32 bits of the address to QueueUsedLow, higher 32 bits to QueueUsedHigh) notifies the device about location of the Used Ring of the queue selected by writing to the QueueSel register. It is allowed only when QueueReady is set to zero (0x0), |
| 0xA4 | W | QueueUsedHigh | |
| 0xFC | R | ConfigGeneration | Configuration atomicity value. Changes every time the configuration noticeably changes |
| 0x100 | RW | Config | Device-specific configuration space starts at an offset 0x100 and is accessed with byte alignment. Its meaning and size depends on the device and the driver.<br>All register values are organized as Little Endian.<br>Accessing memory locations not explicitly described above (or - in case of the configuration space - described in the device specification), writing to the registers described as "R" and reading from registers described as "W" is not permitted and can cause undefined behavior.a |

VIRTUALIZED SYSTEM ENABLING A GUEST OS TO CONTROL AN I/O DEVICE, AND METHOD OF OPERATING THE SAME

CROSS-REFERENCE TO RELATED APPLICATION

This U.S. non-provisional patent application claims priority under 35 USC § 119 to Korean Patent Application No. 10-2021-0175660 filed on Dec. 9, 2021 and to Korean Patent Application No. 10-2022-0020540 filed on Feb. 17, 2022 in the Korean Intellectual Property Office (KIPO), the disclosure of which are incorporated by reference in their entirety herein.

1. TECHNICAL FIELD

Example embodiments relate generally to semiconductor integrated circuits, and more particularly to virtualized systems and methods of operating virtualized systems.

2. DISCUSSION OF RELATED ART

Virtualization allows multiple operating systems to be run on one physical device. Hardware virtualization refers to the creation of a virtual machine that acts like a real computer with an operating system. Software executed on the virtual machine is separated from the underlying hardware resources. Different operating systems may run independently from each other in a virtualization environment provided by a processor to which a virtualization is applied. The virtualization may provide isolation, high availability, workload balancing, sandboxing, hardware agnostic software, etc.

Processors, memories, intellectual properties (IPs) (e.g., functional circuitries or blocks) having various functions may be included in, or implemented by, a virtualized system. Such various hardware devices may be shared by various operating systems. However, current virtualization techniques suffer from software compatibility issues and portability degradation.

SUMMARY

At least one example embodiment of the present disclosure provides a virtualized system in which various operating systems are capable of efficiently sharing various hardware devices.

At least one example embodiment of the present disclosure provides a method of operating the virtualized system.

According to an example embodiment, a virtualized system includes a processor, a host operating system (OS), at least one guest operating system, a hypervisor, at least one hardware input/output (I/O) device and at least one hardware interface device. The processor provides a function for a virtualization environment. The host operating system runs on the virtualization environment. The at least one guest operating system runs on at least one virtual machine of the virtualization environment. The hypervisor implements the virtualization environment using the function of the processor, and generates and controls the at least one virtual machine of the virtualization environment. The at least one hardware input/output device is controlled by the host operating system and the at least one guest operating system. The at least one hardware interface device supports a communication between the at least one guest operating system and the at least one hardware input/output device.

According to an example embodiment, in a method of operating a virtualized system, a virtualization environment is generated by executing a host operating system (OS), at least one guest operating system and a hypervisor using a processor. The processor provides a function for the virtualization environment. The host operating system runs on the virtualization environment. The at least one guest operating system runs on at least one virtual machine of the virtualization environment. The hypervisor implements the virtualization environment using the function of the processor, and generates and controls the at least one virtual machine of the virtualization environment. When at least one hardware input/output (I/O) device is to be controlled by the at least one guest operating system, the at least one hardware input/output device is controlled using at least one hardware interface device. The at least one hardware input/output device is controlled by the host operating system and the at least one guest operating system. The at least one hardware interface device supports communication between the at least one guest operating system and the at least one hardware input/output device.

According to an example embodiment, a virtualized system includes a processor, a host operating system (OS), a first guest operating system, a second guest operating system, a hypervisor, a hardware input/output (I/O) device, a first hardware interface device and a second hardware interface device. The processor provides a function for a virtualization environment. The host operating system runs on a host virtual machine of the virtualization environment. The first guest operating system and the second guest operating system run independently from each other on a first guest virtual machine and a second guest virtual machine of the virtualization environment, respectively, and run independently from the host operating system. The first guest virtual machine and the second guest virtual machine are different from each other. The hypervisor implements the virtualization environment using the function of the processor, and generates and controls the host virtual machine, the first guest virtual machine and the second guest virtual machine of the virtualization environment. The hardware input/output device is controlled by the host operating system, the first guest operating system and the second guest operating system. The first hardware interface device supports communication between the first guest operating system and the hardware input/output device. The second hardware interface device supports communication between the second guest operating system and the hardware input/output device. The second hardware interface device is different from the first hardware interface device. The first guest operating system includes a first guest virtualization driver for performing an operation of the virtualization environment. The hardware input/output device is controlled through the first guest virtualization driver and the first hardware interface device. The second guest operating system includes a second guest virtualization driver for performing an operation of the virtualization environment. The hardware input/output device is controlled through the second guest virtualization driver and the second hardware interface device. The host operating system includes a host virtualization driver for performing an operation on the virtualization environment, and a device driver configured to directly control the hardware input/output device. The hardware input/output device is controlled through the host virtualization driver and the device driver without using the first hardware interface device or the second hardware interface device.

In the virtualized system and the method of operating the virtualized system according to example embodiments, the virtualization for the hardware input/output device is implemented using hardware. For example, the virtualized system may include a virtualization driver that controls the guest operating system and the virtualized input/output device using an interface provided by the virtualized input/output device. The non-virtualized hardware input/output device and the virtualized hardware input/output device may provide the same interface, and thus the virtualization driver in the guest operating system may control both the virtualized and non-virtualized hardware input/output devices.

Therefore, the guest operating system may communicate with a hardware input/output device that provides the same interface as the virtualized hardware input/output device, and may communicate with the hardware input/output device without passing through complex software layers for implementing the virtualization. Accordingly, the performance of the hardware input/output device may be maintained and the performance degradation may be prevented, and the compatibility and portability of the software may be guaranteed or ensured.

BRIEF DESCRIPTION OF THE DRAWINGS

Illustrative, non-limiting example embodiments will be more clearly understood from the following detailed description taken in conjunction with the accompanying drawings.

FIGS. 9A and 9B are diagrams for describing an operation of a virtualized system of FIGS. 7 and 8.

DETAILED DESCRIPTION OF THE EMBODIMENTS

Figure 1:
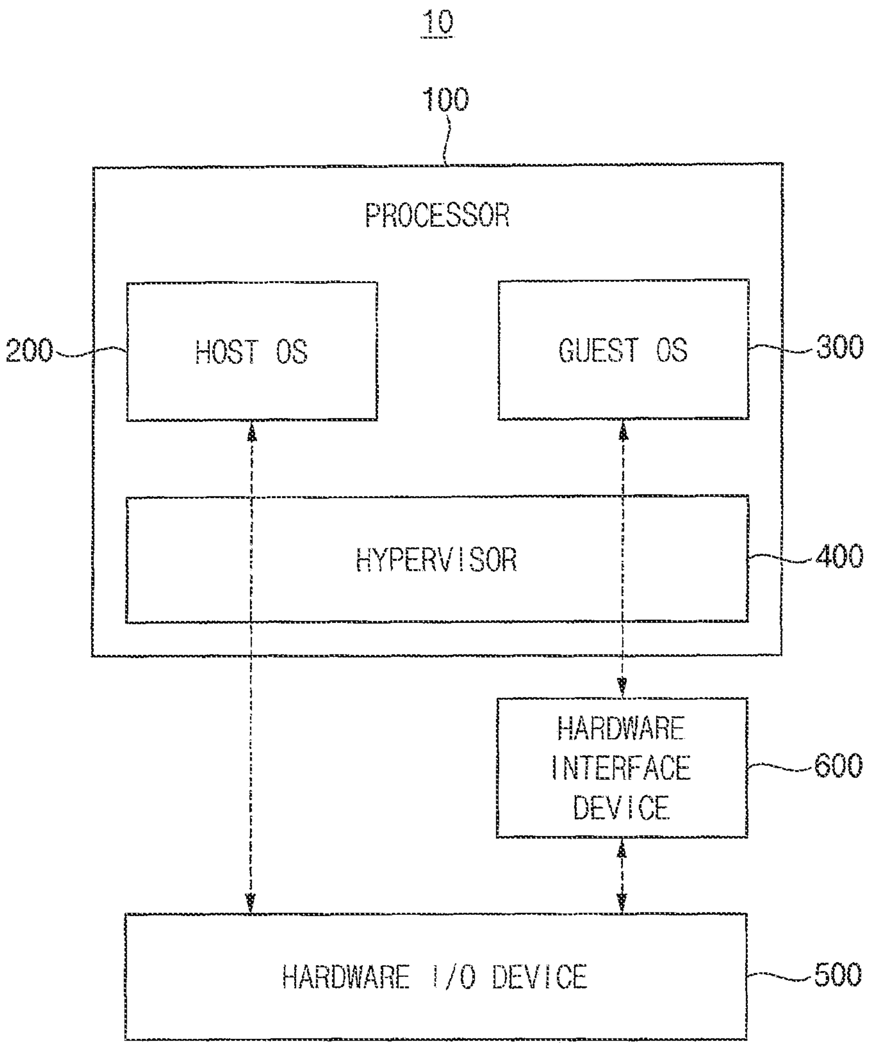
FIG. 1 is a block diagram illustrating a virtualized system according to an example embodiment.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

FIG. 1 is a block diagram illustrating a virtualized system according to an example embodiment.

Referring to FIG. 1, a virtualized system 10 includes a processor 100, at least one hardware input/output (I/O) device 500, and at least one hardware interface device 600. The processor 100 includes a host operating system (OS) 200, at least one guest operating system 300, and a hypervisor 400.

The processor 100 provides a function for implementing a virtualization environment. The host operating system 200, the at least one guest operating system 300 and the hypervisor 400 may run or operate on the virtualization environment.

For example, the host operating system 200 may run on a host virtual machine of the virtualization environment. The at least one guest operating system 300 may run on at least one guest virtual machine of the virtualization environment. In an embodiment, the at least one guest operating system 300 runs or operates independently from the host operating system 200. The hypervisor 400 may implement or generate the virtualization environment using a function of the processor 100, and may generate (or create) and control the host virtual machine and the at least one guest virtual machine on the virtualization environment.

For convenience of illustration, FIG. 1 illustrates only one guest operating system 300. However, example embodiments are not limited thereto, and the number of guest operating systems running on the hypervisor 400 may be variously determined according to the virtualization environment. For example, as will be described with reference to FIG. 10, the virtualized system may include two or more guest operating systems.

In addition, for convenience of illustration, FIG. 1 illustrates that the host operating system 200, the at least one guest operating system 300 and the hypervisor 400 are included in the processor 100. However, example embodiments are not limited thereto, and the host operating system 200, the at least one guest operating system 300 and the hypervisor 400 may be loaded into a memory device as software programs and may be executed by the processor 100.

For example, as will be described with reference to FIG. 12, the virtualized system may further include a memory device and a storage device. The memory device may store data and program codes. Software program codes for implementing the virtualization environment, such as the host operating system 200, the at least one guest operating system 300 and the hypervisor 400, etc., may be loaded into the memory device, and the loaded software program codes may be executed by the processor 100. The storage device may store the host operating system 200, the at least one guest operating system 300 and the hypervisor 400. For example, while the virtualized system is booted up, the software program codes stored in the storage device may be loaded into the memory device according to a booting sequence, and the processor 100 may provide the virtualization environment based on the loaded software program codes. As such, the memory device may function as a working memory of the virtualized system. For example, the memory device may be implemented with a volatile memory such as a dynamic random access memory (DRAM), a static random access memory (SRAM), etc., but example embodiments are not limited thereto. For example, the storage device may be implemented with a nonvolatile memory such as an electrically erasable programmable read-only memory (EEPROM), a flash memory, a phase-change random access memory (PRAM), a resistive random access memory (RRAM), a magnetic random access memory (MRAM), a ferroelectric random access memory (FRAM), etc., but example embodiments are not limited thereto.

An example configuration of the virtualization environment will be described with reference to FIG. 3.

The at least one hardware input/output device 500 may be controlled by the host operating system 200 and the at least one guest operating system 300. For example, the at least one hardware input/output device 500 may includes at least one of various physical hardware devices such as a memory device, a camera, a graphics processing unit (GPU), a neural processing unit (NPU), a peripheral component interconnect express (PCIe) device, a universal flash storage (UFS) device, etc. Although FIG. 1 illustrates only one hardware input/output device, example embodiments are not limited thereto, and the number of hardware input/output devices may be variously determined according to example embodiments. For example, as will be described with reference to FIG. 11, the virtualized system may include two or more hardware input/output devices.

The at least one hardware interface device 600 supports communication between the at least one guest operating system 300 and the at least one hardware input/output device 500. For example, the at least one hardware interface device 600 may be a physical hardware device for communicating with the at least one hardware input/output device 500. Although FIG. 1 illustrates only one hardware interface device, example embodiments are not limited thereto, and the number of hardware interface devices may be variously determined according to the number of guest operating systems and/or the number of hardware input/output devices. For example, as will be described with reference to FIGS. 10 and 11, the virtualized system may include two or more hardware interface devices.

In some example embodiments, as described with reference to FIG. 1 and as will be described with reference to FIG. 7, the at least one hardware interface device 600 may be implemented and/or formed independently from the at least one guest operating system 300 and the hypervisor 400. In other example embodiments, as will be described with reference to FIG. 8, the at least one hardware interface device 600 may be implemented and/or formed to be included in the hypervisor 400.

An example configuration of the at least one hardware interface device 600 will be described with reference to FIGS. 7 and 8.

In an example embodiment, the virtualized system 10 operates based on a virtual I/O device (VIRTIO) specification (or standard).

Figure 2:
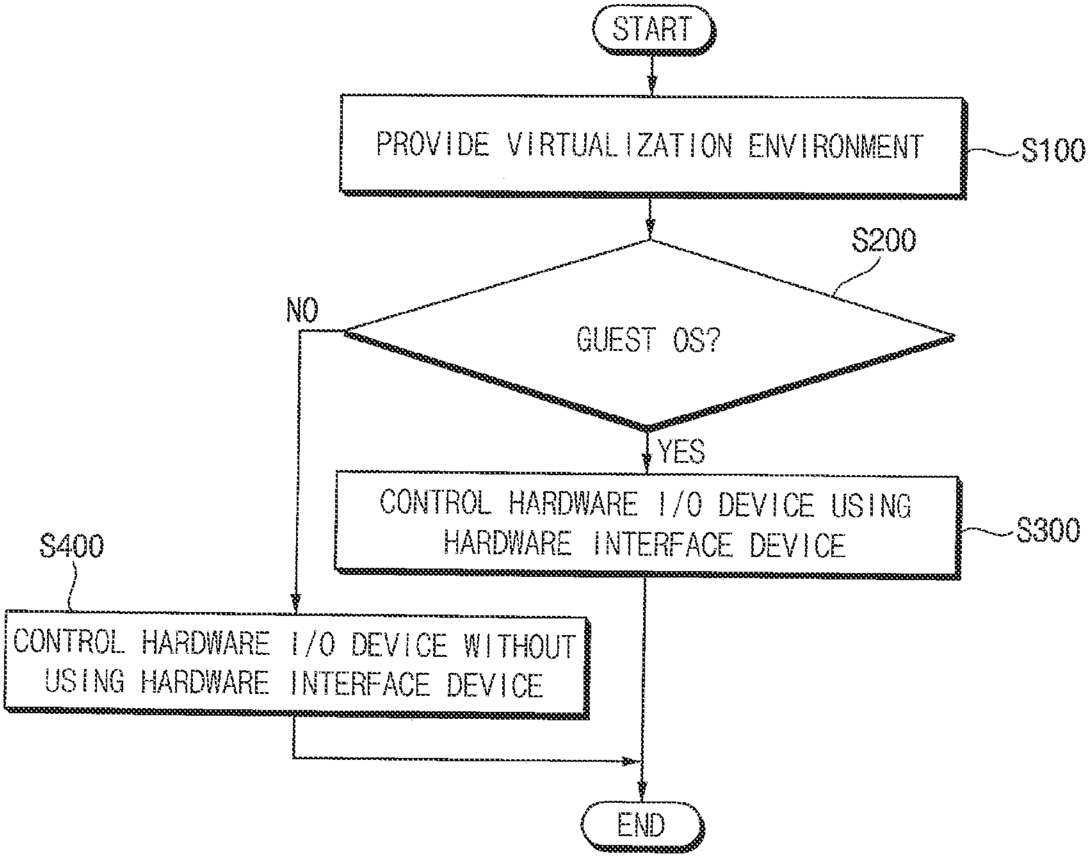
FIG. 2 is a flowchart illustrating a method of operating a virtualized system according to an example embodiment.

FIG. 2 is a flowchart illustrating a method of operating a virtualized system according to an example embodiment.

Referring to FIGS. 1 and 2, in a method of operating a virtualized system according to an example embodiment, the virtualized system 10 provides (or generates) the virtualization environment by executing the host operating system 200, the at least one guest operating system 300 and the hypervisor 400 using the processor 100 (step S100). The processor 100 provides the function for the virtualization environment. The host operating system 200 runs on the virtualization environment. The at least one guest operating system 300 runs on the at least one virtual machine of the virtualization environment. The hypervisor 400 implements the virtualization environment using a function of the processor 100, and generates and controls the at least one virtual machine on the virtualization environment.

The at least one hardware input/output device 500 may be controlled by the host operating system 200 and the at least one guest operating system 300. A scheme or manner of controlling the at least one hardware input/output device 500 may be changed (or may vary) according to whether a subject or an agent controlling the at least one hardware input/output device 500 is the host operating system 200 or the at least one guest operating system 300.

For example, when the at least one hardware input/output device 500 is to be controlled by the at least one guest operating system 300 (step S200: YES), the at least one hardware input/output device 500 is controlled using the at least one hardware interface device 600 (step S300). The at least one hardware interface device 600 supports the communication between the at least one guest operating system 300 and the at least one hardware input/output device 500. FIG. 1 illustrates the operation of step S300 by an arrowed line between the at least one guest operating system 300 and the at least one hardware interface device 600, and an arrowed line between the at least one hardware interface device 600 and the at least one hardware input/output device 500.

For example, when the at least one hardware input/output device 500 is to be controlled by the host operating system 200 (step S200: NO), the at least one hardware input/output device 500 is controlled without using the at least one hardware interface device 600 (step S400). FIG. 1 illustrates the operation of step S400 by an arrowed line between the host operating system 200 and the at least one hardware input/output device 500.

A virtualization for a hardware input/output device may be implemented using only software. However, when only software is used in this manner, performance of the hardware input/output device may be degraded or deteriorated as complex software layers are implemented. Further, when the software is used in this manner, compatibility and portability of the software may be degraded or deteriorated as a dedicated hardware input/output device is used.

In the virtualized system and the method of operating the virtualized system according to an example embodiment, the virtualization for the hardware input/output device is instead implemented using hardware. For example, the virtualized system 10 may include the at least one hardware interface device 600 supporting the communication between the at least one guest operating system 300 and the at least one hardware input/output device 500. The at least one guest operating system 300 may control the at least one hardware input/output device 500 using the at least one hardware interface device 600.

In addition, as will be described later, the virtualized system may include a virtualization driver that controls the guest operating system 300 and the virtualized input/output device using an interface provided by the virtualized input/output device. The non-virtualized hardware input/output device and the virtualized hardware input/output device may provide the same interface, and thus the virtualization driver in the guest operating system 300 may control both the virtualized and non-virtualized hardware input/output devices.

Therefore, the guest operating system 300 may communicate with a hardware input/output device 500 that provides the same interface as the virtualized hardware input/output device, and may communicate with the hardware input/output device 500 without passing through complex software layers for implementing the virtualization. Accordingly, the performance of the hardware input/output device 500 may be maintained and the performance degradation may be prevented, and the compatibility and portability of the software may be guaranteed or ensured.

Figure 3:
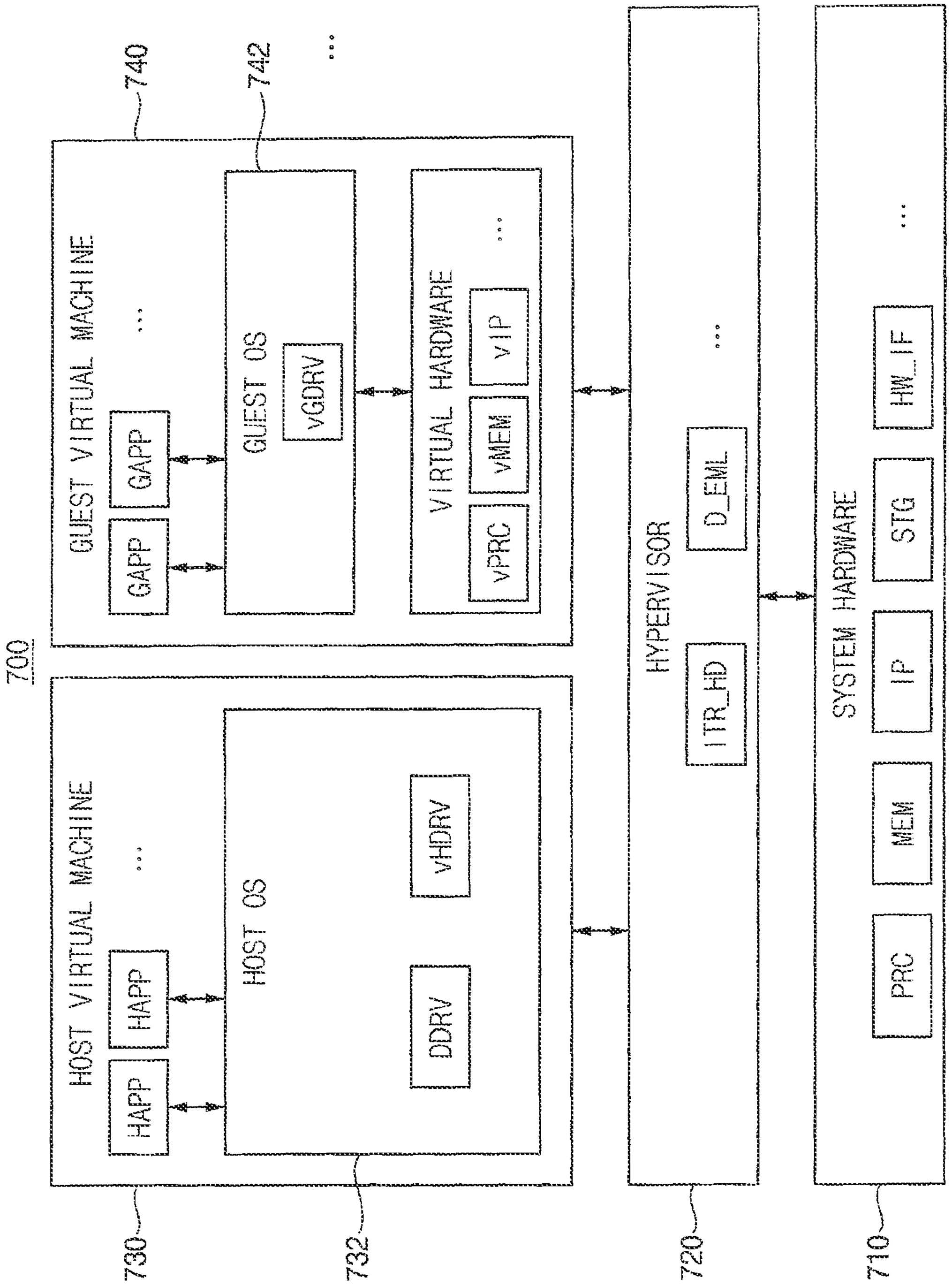
FIG. 3 is a diagram for describing a virtualization environment implemented by a virtualized system according to an example embodiment.

FIG. 3 is a diagram for describing a virtualization environment implemented by a virtualized system according to an example embodiment.

Referring to FIG. 3, a virtualized system 700 may include system hardware 710 and software runs on a virtualization environment provided by the system hardware 710. The software may include a hypervisor 520 and a plurality of virtual machines 730 and 740. For convenience of illustration, FIG. 3 illustrates only two virtual machines 730 and 740, which are a host virtual machine 730 and a guest virtual machine 740. However, example embodiments are not limited thereto, and the number of virtual machines installed on the hypervisor 720 may be variously determined according to example embodiments. For example, the virtualized system 700 may include two or more guest virtual machines.

The system hardware 710 may include a processor PRC that provides the virtualization environment, a memory device MEM, one or more intellectual properties IPs, a storage device STG, a hardware interface device HW_IF, and the like.

For example, the processor PRC may be a single processor or may include a plurality of processor cores. When the processor PRC includes the plurality of processor cores, one of the processor cores may correspond to the processor 100 in FIG. 1 that provides the virtualization environment.

For example, the memory device MEM may include at least one volatile memory. The intellectual property IP may include hardware devices having various functions, such as a camera, a GPU, an NPU, and the like. The storage device STG may include at least one nonvolatile memory. The memory device MEM, the intellectual property IP and the storage device STG may correspond to the hardware input/output device 500 in FIG. 1. In addition, the hardware interface device HW_IF may correspond to the hardware interface device 600 in FIG. 1.

The virtual machines 730 and 740 may have various configurations to perform respective functions.

For example, the host virtual machine 730 may include a host operating system 732 and host applications HAPPs. The host applications HAPP may run or execute on the host operating system 732.

The host operating system 732 may include a host virtualization driver vHDRV and a device driver DDRV. The host virtualization driver vHDRV may be a driver for an operation of the virtualization environment. The device driver DDRV may be a driver for directly controlling the processor PRC, the memory device MEM, the intellectual property IP, etc. (e.g., the hardware input/output device 500 in FIG. 1) included in the system hardware 710. As described with reference to FIGS. 1 and 2, the host operating system 732 may directly control the processor PRC, the memory device MEM, the intellectual property IP, etc. (e.g., the hardware input/output device 500 in FIG. 1) included in the system hardware 710, without using the hardware interface device HW_IF.

In addition, the guest virtual machine 740 may include virtual hardware, a guest operating system 742 and guest applications GAPPs. The guest applications GAPPs may run or execute on the guest operating system 742.

The virtual hardware may correspond to physical components that are emulated as software in the guest virtual machine 740. In other words, corresponding physical components of the virtualized system 700 may be virtualized as the virtual hardware. The virtual hardware may include virtual components emulating the physical components allocated to the guest virtual machine 740 among the entire physical components in the system hardware 710. For example, the virtual hardware may include a virtual processor vPRC emulating the processor PRC, a virtual memory device vMEM emulating the memory device MEM, a virtual intellectual property vIP emulating the intellectual property IP, etc.

The guest operating system 742 may include a guest virtualization driver vGDRV. The guest virtualization driver vGDRV may be a driver for an operation of the virtualization environment. For example, the guest virtualization driver vGDRV may control the processor PRC, the memory device MEM, the intellectual properties IP (e.g., the hardware input/output device 500 in FIG. 1) included in the system hardware 710 via the virtual processor vPRC, the virtual memory device vMEM and the virtual intellectual property vIP included in the virtual hardware. As described with reference to FIGS. 1 and 2, the guest operating system 742 may control the processor PRC, the memory device MEM, the intellectual property IP, etc. (e.g., the hardware input/output device 500 in FIG. 1) included in the system hardware 710, using the hardware interface device HW_IF.

The guest operating system 742 may further include a virtual memory management unit, a state monitor, etc. The virtual memory management unit may allocate a virtual address space of the guest operating system 742 to the guest applications GAPPs running on the guest operating system 742, and may manage a mapping operation between a virtual address in the virtual address space and an intermediate physical address of the virtual memory device vMEM included in the virtual hardware. The state monitor may provide state information by monitoring the guest virtual machine 740 and/or the guest operating system 742. For example, the state monitor may provide the state information periodically while the guest virtual machine 740 operates normally. In this case, the hypervisor 720 may determine it is necessary to reboot the guest operating system 742 when the state information is not provided for a predetermined time interval.

The hypervisor 720 may generate, schedule and manage the plurality of virtual machines 730 and 740. The hypervisor 720 may provide an interface between the plurality of virtual machines 730 and 740 and the system hardware 710, and manage an execution of instructions and data transfer associated with the plurality of virtual machines 730 and 740. The hypervisor 720 may be referred to as a virtual machine monitor or a virtual machine manager.

The hypervisor 720 may include an interrupt handler ITR_HD, a device emulator D_EML, and the like.

The interrupt handler ITR_HD may control an operation of the virtualized system 700 based on information from the virtual machines 730 and 740 and/or information from the system hardware 710.

The device emulator D_EML may allocate the physical components to the guest virtual machine 740, and may establish and manage the virtual hardware by emulating the allocated physical components.

The hypervisor 720 may further include a virtual memory management unit, a device driver, etc. The virtual memory management unit may allocate one or a plurality of guest memory regions of the memory device MEM included in the system hardware 710 to the guest virtual machine 740 or the guest operating system 742, and may manage a mapping operation between the intermediate physical address of the virtual memory devices vMEM included in the virtual hardware and a physical address of the memory device MEM. The device driver may directly control the processor PRC, the memory device MEM, the intellectual properties IP (e.g., the hardware input/output device 500 in FIG. 1) included in the system hardware 710.

Although FIG. 3 illustrates only one guest virtual machine, example embodiments are not limited thereto. For example, the virtualized system 700 may include two or more guest virtual machines, and another guest virtual machine may also be implemented with the same or similar structure to the guest virtual machine 740.

Figure 4:
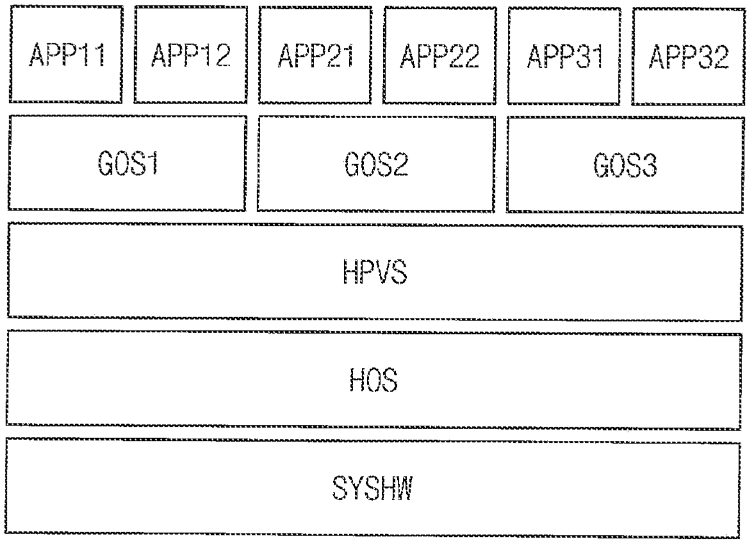
FIGS. 4, 5 and 6 are diagrams illustrating examples of a hierarchical structure of a virtualization environment implemented by a virtualized system according to an example embodiment.
Figure 5:
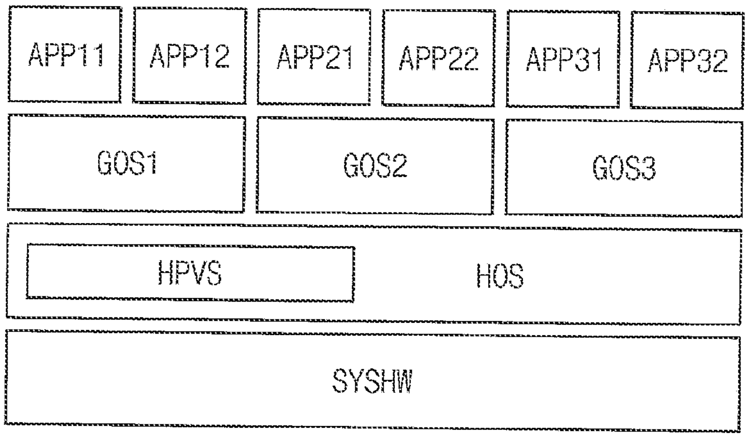
Figure 6:
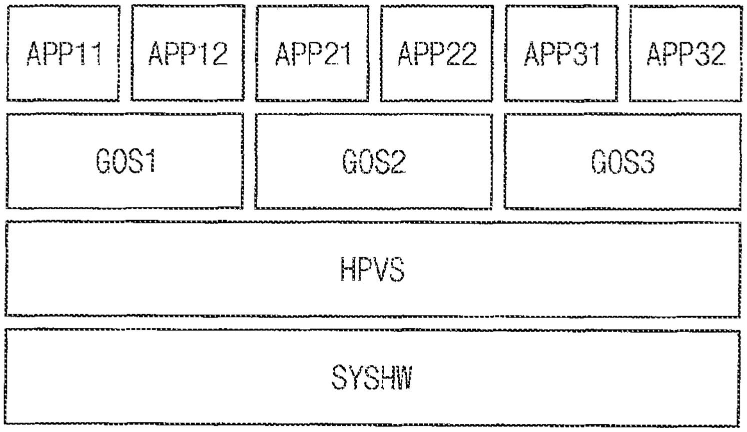

FIGS. 4, 5 and 6 are diagrams illustrating examples of a hierarchical structure of a virtualization environment implemented by a virtualized system according to an example embodiment.

Referring to FIGS. 4, 5 and 6, examples where the virtualization environment includes a plurality of guest operating systems GOS1, GOS2 and GOS3 are illustrated.

For example, a virtualization environment may include a plurality of guest operating systems GOS1, GOS2 and GOS3 and applications running on the plurality of guest operating systems GOS1, GOS2 and GOS3. For example, applications APP11 and APP12 may run on the first guest operating system GOS1, the applications APP21 and APP22 may run on the second guest operating system GOS2, and the applications APP31 and APP32 may run on the third guest operating system GOS3. The number of guest operating systems and the number of applications running on each guest operating system may be variously determined according to example embodiments.

A hypervisor HPVS (e.g., 400) may be classified or divided largely into a first type and a second type. FIGS. 4 and 5 illustrate the hypervisor HPVS of the first type, and FIG. 6 illustrates the hypervisor HPVS of the second type. The hypervisor HPVS of the first type in FIGS. 4 and 5 may be referred to as a hosted hypervisor, and the hypervisor HPVS of the second type in FIG. 6 may be referred to as a standalone hypervisor. For example, a representative open source hypervisor may include a kernel-based virtual machine (KVM) of the first type and Xen based hypervisor of the second type.

For example, the hypervisor HPVS of the first type may run on a host operating system HOS as illustrated in FIG. 4, or may be included in the host operating system HOS as illustrated in FIG. 5. In this case, the host operating system HOS may have a full control with respect to a system hardware SYSHW (e.g., 710). The host operating system HOS may run on the system hardware SYSHW and the applications may run on the host operating system HOS.

For example, the hypervisor HPVS of the second type may run on the system hardware SYSHW and may have a full control with respect to the system hardware SYSHW, as illustrated in FIG. 6. In this case, the host operating system is not present in the virtualization hierarchical structure, and one of the guest operating systems GOS1, GOS2 and GOS3 may perform a function of the host operating system. The applications may run on the hypervisor HPVS of the second type.

Hereinafter, example embodiments will be described based on the hypervisor HPVS of the first type in FIGS. 4 and 5, but example embodiments are not limited thereto. Example embodiments may be applied to any virtualized systems including the hypervisor HPVS of the second type in FIG. 6 or other types.

Hereinafter, example embodiments will be described based on a case where the virtualized system is implemented and/or operate based on the VIRTIO specification. However, example embodiments are not limited thereto, and the virtualized system may be implemented and/or operate based on various specifications associated with or related to the virtualized system.

Figure 7:
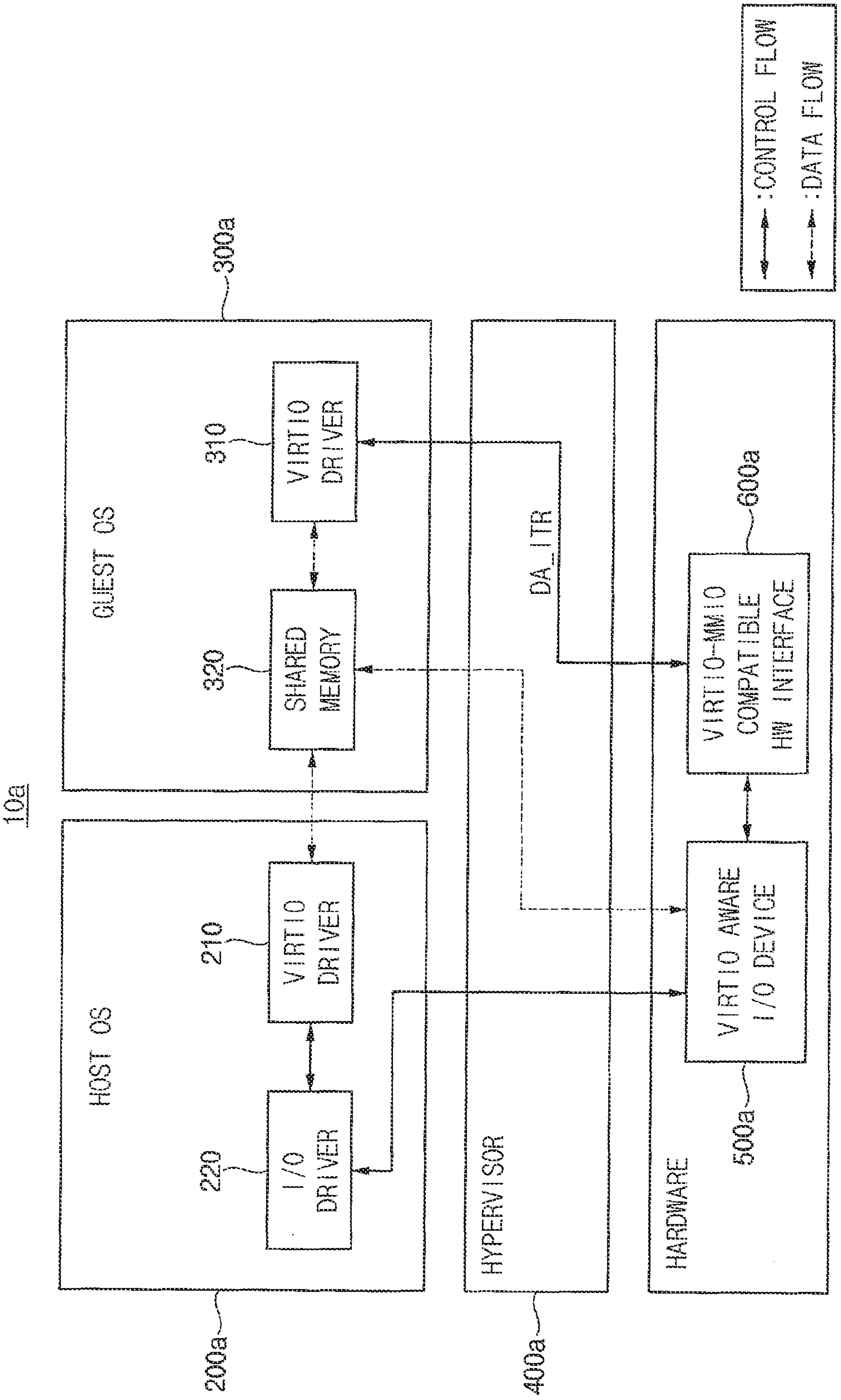
FIGS. 7 and 8 are block diagrams illustrating examples of a virtualized system of FIG. 1.
Figure 8:
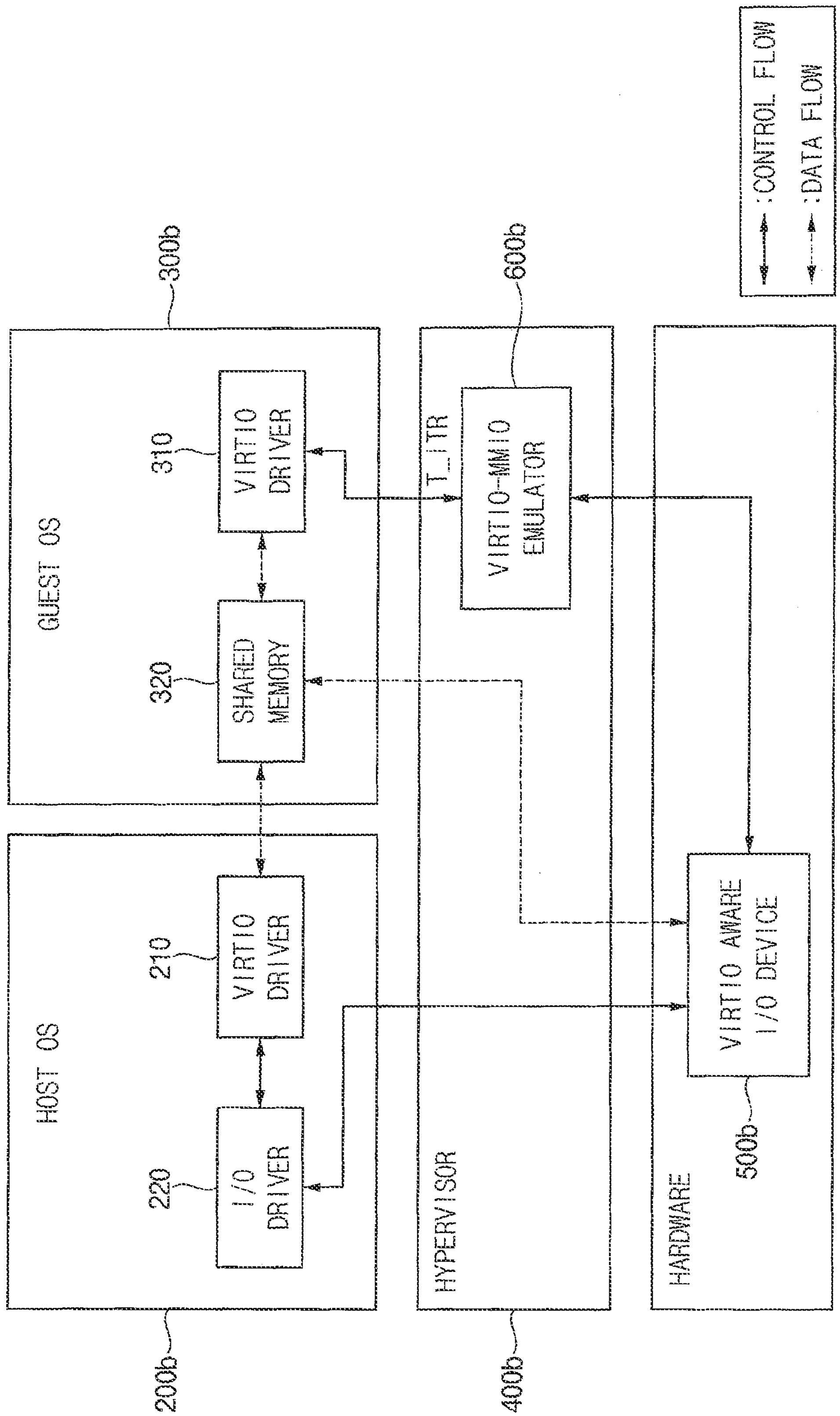

FIGS. 7 and 8 are block diagrams illustrating examples of a virtualized system of FIG. 1. The descriptions repeated with FIG. 1 will be omitted.

Referring to FIG. 7, a virtualized system 10*a* may include a host operating system 200*a*, a guest operating system 300*a*, a hypervisor 400*a*, a hardware input/output device 500*a* and a hardware interface device 600*a*.

The guest operating system 300*a* may include a guest virtualization driver 310. The guest virtualization driver 310 may be a driver for an operation of the virtualization environment, and may correspond to the guest virtualization driver vGDRV in FIG. 3.

In an example embodiment, when the virtualized system 10*a* operates based on the VIRTIO specification, the guest virtualization driver 310 is implemented in the form of a VIRTIO driver. The VIRTIO driver may control the hardware input/output device 500*a* by reading and/or writing each field of VIRTIO-MMIO (memory mapped I/O) according to the purpose of fields of VIRTIO-MMIO defined in the VIRTIO specification.

The hardware input/output device 500*a* may be controlled by the host operating system 200*a* and the guest operating system 300*a*. The hardware input/output device 500*a* may correspond to the processor PRC, the memory device MEM, the intellectual property IP, etc. included in the system hardware 710 of FIG. 3.

In an example embodiment, when the virtualized system 10*a* operates based on the VIRTIO specification, the hardware input/output device 500*a* is implemented in the form of a VIRTIO aware input/output device. A firmware of the VIRTIO aware input/output device 500*a* may communicate with the VIRTIO driver 310 in the guest operating system 300*a* through the hardware interface device 600*a*, and a hardware operation corresponding to a control of the VIRTIO driver 310 may be performed by operating in compliance with a device operation defined in the VIRTIO specification.

The hardware interface device 600*a* may support a communication between the guest operating system 300*a* and the hardware input/output device 500*a*. The hardware interface device 600*a* may correspond to the hardware interface device HW_IF included in the system hardware 710 of FIG. 3.

In some example embodiments, the hardware interface device 600*a* may be formed and/or implemented independently from the guest operating system 300*a* and the hypervisor 400*a*, as illustrated in FIG. 7. In other words, the hardware interface device 600*a* may be implemented as a separate hardware that is not included in the guest operating system 300*a* and the hypervisor 400*a*. For example, the hardware interface device 600*a* may be implemented in hardware separate from hardware including the guest operating system 300*a* and the hypervisor 400*a*.

In an example embodiment, when the virtualized system 10*a* operates based on the VIRTIO specification, the hardware interface device 600*a* is implemented in the form of a VIRTIO-MMIO compatible hardware interface. The VIRTIO-MMIO compatible hardware interface may be a hardware device compatible with a layout of VIRTIO-MMIO defined in the VIRTIO specification, and may be implemented as a hardware mailbox or memory device.

Although FIG. 7 illustrates that the hardware input/output device 500*a* and the hardware interface device 600*a* are separate hardwares, example embodiments are not limited thereto. For example, the hardware input/output device 500*a* and the hardware interface device 600*a* may be implemented as a single hardware. For example, the hardware interface device 600*a* may be included in the hardware input/output device 500*a*.

In an example embodiment, the guest operating system 300*a* controls the hardware input/output device 500*a* through the guest virtualization driver 310 and the hardware interface device 600*a*. In this embodiment, a control of the hardware input/output device 500*a* by the guest virtualization driver 310 may be provided directly to the hardware interface device 600*a* without being trapped or handled by the hypervisor 400*a*. For example, a direct access interrupt DA_ITR may be transmitted between the guest virtualization driver 310 and the hardware interface device 600*a*. For example, the guest virtualization driver 310 may provide the direct access interrupt.

DA_ITR to the hypervisor 400*a*, and the hypervisor 400*a* may forward the direct access interrupt DA_ITR to the hardware interface device 600*a* without the hypervisor 400*a* performing an operation on the direct access interrupt DA_ITR. FIG. 7 illustrates the above-described control operation by arrowed solid lines between the guest virtualization driver 310, the hardware interface device 600*a* and the hardware input/output device 500*a*.

In an example embodiment, the virtualized system 10*a* further includes a shared memory 320 that is shared by the host operating system 200*a* and the guest operating system 300*a*. The guest operating system 300*a* may exchange data with the hardware input/output device 500*a* through the guest virtualization driver 310 and the shared memory 320. FIG. 7 illustrates the above-described data exchange operation by arrowed dotted lines between the guest virtualization driver 310, the shared memory 320 and the hardware input/output device 500*a*.

For convenience of illustration, FIG. 7 illustrates that the shared memory 320 is included in the guest operating system 300*a*. However, example embodiments are not limited thereto. For example, the shared memory 320 may be disposed or located separately from the host operating system 200*a* and the guest operating system 300*a*, and may be shared by the host operating system 200*a* and the guest operating system 300*a*.

The host operating system 200*a* may include a host virtualization driver 210 and a device driver 220. The host virtualization driver 210 may be a driver for an operation of the virtualization environment, and may correspond to the host virtualization driver vHDRV in FIG. 3. The device driver 220 may be a driver for directly controlling the hardware input/output device 500*a*, and may correspond to the device driver DDRV in FIG. 3. For example, the device driver 220 may directly control the hardware input/output device 500*a* without using the hardware interface device 600*a*. For example, the device driver 220 may provide a command or a control signal to the hypervisor 400*a* and the hypervisor 400*a* may forward the command or the control signal directly to the hardware input/output device 500*a*.

In an example embodiments when the virtualized system 10*a* operates based on the VIRTIO specification, the host virtualization driver 210 is implemented in the form of a VIRTIO driver similar to the guest virtualization driver 310, and the device driver 220 may be implemented in the form of an input/output driver.

In an example embodiment, the host operating system 200*a* controls the hardware input/output device 500*a* through the host virtualization driver 210 and the device driver 220 without using the hardware interface device 600*a*. FIG. 7 illustrates the above-described control operation by arrowed solid lines between the host virtualization driver 210, the device driver 220 and the hardware input/output device 500*a*.

In some example embodiments, the host operating system 200*a* may run on a Linux™ virtual machine. In this case, the host virtualization driver 210 may run on a user space, the device driver 220 may run on a Linux™ kernel as a physical device driver, and the virtualized system may further include virtualized hardware abstraction layer (HAL) servers operating on the user space.

In some example embodiments, the guest operating system 300*a* may run on an Android Trout™ operating interoperable with (or in conjunction with) the Linux™ virtual machine. In this case, the guest virtualization driver 310 may run on the Linux™ kernel, and the virtualized system may further include a HAL and a virtualized HAL operating on the user space. For example, the above-described configurations may be implemented using the VIRTIO aware input/output device without software modification.

Referring to FIG. 8, a virtualized system 10*b* may include a host operating system 200*b*, a guest operating system 300*b*, a hypervisor 400*b*, a hardware input/output device 500*b* and a hardware interface device 600*b*.

The host operating system 200*b*, the guest operating system 300*b* and the hardware input/output device 500*b* may be substantially the same as the host operating system 200*a*, the guest operating system 300*a* and the hardware input/output device 500*a* in FIG. 7, respectively. The descriptions repeated with FIG. 7 will be omitted.

The hardware interface device 600*b* supports a communication between the guest operating system 300*b* and the hardware input/output device 500*b*. The hardware interface device 600*b* may correspond to the hardware interface device HW_IF included in the system hardware 710 of FIG. 3.

In some example embodiments, the hardware interface device 600*b* may be formed and/or implemented to be included in the hypervisor 400*b*, as illustrated in FIG. 8. For example, the hardware interface device 600*b* may be implemented as a hardware emulator included in the hypervisor 400*b*.

In an example embodiment, when the virtualized system 10*a* operates based on the VIRTIO specification, the hardware interface device 600*b* (e.g., the hardware emulator) is implemented in the form of a VIRTIO-MMIO emulator. A read from and/or write to VIRTIO-MMIO of the VIRTIO driver may be trapped and stored by the hypervisor 400*b*, the hypervisor 400*b* may update the contents of VIRTIO-MMIO to the VIRTIO aware input/output device if necessary, and the VIRTIO aware input/output device may recognize the contents of the stored MMIO and may perform corresponding hardware operations.

In an example embodiment, the guest operating system 300*b* controls the hardware input/output device 500*b* through the guest virtualization driver 310 and the hardware interface device 600*b* (e.g., a hardware emulator). In this case, a control of the hardware input/output device 500*b* by the guest virtualization driver 310 may be trapped or handled by the hypervisor 400*b*, and may be provided to the hardware interface device 600*b*. For example, a trapped interrupt T_ITR may be transmitted between the guest virtualization driver 310 and the hardware interface device 600*b*. FIG. 8 illustrates the above-described control operation by arrowed solid lines between the guest virtualization driver 310, the hardware interface device 600*b* and the hardware input/output device 500*b*.

The trapped interrupt T_ITR may be a synchronous interrupt that is referred to as a trap. In an embodiment, an exception occurs while the guest operating system 300*b* is operating and the guest virtualization driver 310 sends the trapped interrupt T_ITR to the hardware interface device 600*b* when the exception occurs. In response to receiving the trapped interrupt T_ITR, the hardware interface device 600*b* saves parameters that the guess operating system 300*b* needs to operate such as stack pointers, registers, program variable, etc. and suspends execution or stops execution of the guest operating system 300*b*. For example, the trapped interrupt T_ITR may be a signal including information on the type of exception that occurred such as a software or hardware exception with respect to the hardware input/output device 500*b*. The hardware interface device 600*b* may perform an action in response to the trapped interrupt T_ITR, restore the registers, stack pointers, variables, etc. of the guest operating system 300*b*, and resume or restart the guest operating system 300*b*. For example, the action could cause a reset of the hardware input/output device 500*b*, output an error message, etc.

In some example embodiments, the virtualized system 10*b* may further include a shared memory 320 that is shared by the host operating system 200*b* and the guest operating system 300*b*.

The guest operating system 300*b* may exchange data with the hardware input/output device 500*b* through the guest virtualization driver 310 and the shared memory 320. FIG. 8 illustrates the above-described data exchange operation by arrowed dotted lines between the guest virtualization driver 310, the shared memory 320 and the hardware input/output device 500*b*.

FIGS. 9A and 9B are diagrams for describing an operation of a virtualized system of FIGS. 7 and 8.

Referring to FIGS. 9A and 9B, a layout of the MMIO device defined in the VIRTIO specification is illustrated. "Offset" represents an offset from a base, "RW" represents a direction of read R and write W, and "Register" and "Description" represent a name and an operation of each function.

Virtualization environments without peripheral component interconnect (PCI) support (a common situation in embedded devices models) may use a simple memory mapped device ("VIRTIO-MMIO") instead of a PCI device. The VIRTIO-MMIO behavior is based on the PCI device specification. Therefore, most operations including device initialization, queues configuration and buffer transfers are nearly identical to the PCI device.

In some example embodiments, the hardware interface device 600*a* in FIG. 7 (e.g., the VIRTIO-MMIO compatible hardware interface) may support all of the read/write illustrated in FIGS. 9A and 9B, and the hardware interface device 600*b* in FIG. 8 (e.g., the VIRTIO-MMIO emulator) may support some of the read/write illustrated in FIGS. 9A and 9B.

Figure 10:
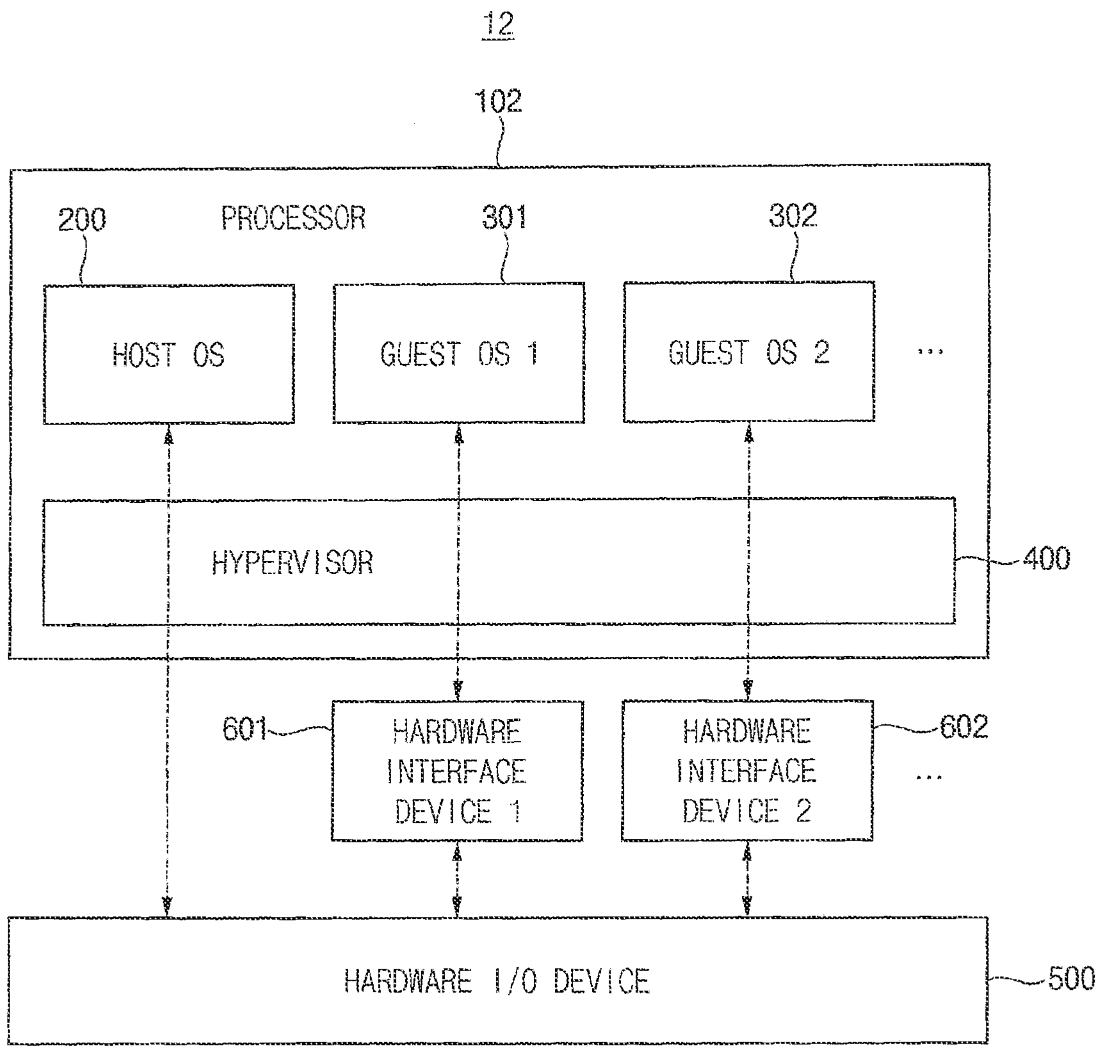
FIGS. 10 and 11 are block diagrams illustrating a virtualized system according to an example embodiment.
Figure 11:
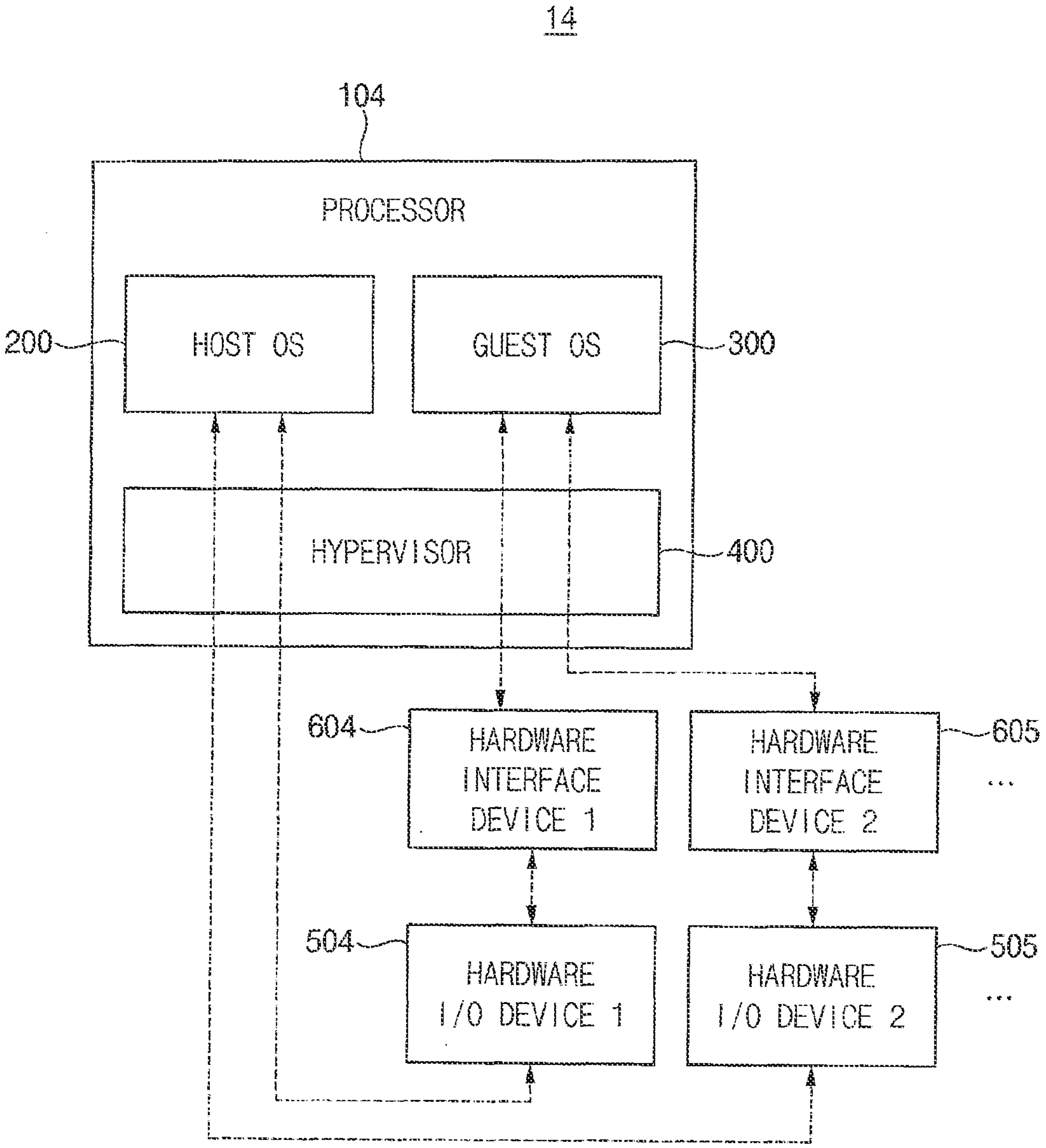

FIGS. 10 and 11 are block diagrams illustrating a virtualized system according to an example embodiment. The descriptions repeated with FIG. 1 will be omitted.

Referring to FIG. 10, a virtualized system 12 includes a processor 102, at least one hardware input/output device 500 and a plurality of hardware interface devices 601 and 602. The processor 102 includes a host operating system 200, a plurality of guest operating systems 301 and 302 and a hypervisor 400.

The virtualization system 12 may be substantially the same as the virtualization system 10 of FIG. 1, except that the virtualization system 12 includes the plurality of guest operating systems 301 and 302 and the plurality of hardware interface devices 601 and 602.

The plurality of guest operating systems 301 and 302 may include a first guest operating system 301 and a second guest operating system 302. The first guest operating system 301 may run on a first virtual machine of the virtualization environment. The second guest operating system 302 may run on a second virtual machine of the virtualization environment, and may run independently from the first guest operating system 301. For example, each of the plurality of guest operating systems 301 and 302 may be implemented as described with reference to FIG. 3.

The plurality of hardware interface devices 601 and 602 may include a first hardware interface device 601 and a second hardware interface device 602. The first hardware interface device 601 may support a communication between the first guest operating system 301 and the at least one hardware input/output device 500. The second hardware interface device 602 may support a communication between the second guest operating system 302 and the at least one hardware input/output device 500. For example, each of the plurality of hardware interface devices 601 and 602 may be implemented as described with reference to FIGS. 7 and 8.

In some example embodiments, when the virtualized system 12 includes the plurality of guest operating systems 301 and 302, one hardware interface device may be formed and/or implemented for each guest operating system, and each guest operating system may control the at least one hardware input/output device 500 using a corresponding hardware interface device. For example, when the first guest operating system 301 wants to control the at least one hardware input/output device 500, the at least one hardware input/output device 500 may be controlled using the first hardware interface device 601. For example, when the second guest operating system 302 wants to control the at least one hardware input/output device 500, the at least one hardware input/output device 500 may be controlled using the second hardware interface device 602.

For convenience of illustration, FIG. 10 illustrates only two guest operating systems 301 and 302 and two hardware interface devices 601 and 602. However, example embodiments are not limited thereto, and the number of guest operating systems and hardware interface devices may be variously determined according to example embodiments.

Referring to FIG. 11, a virtualized system 14 includes a processor 104, a plurality of hardware input/output device 504 and 505, and a plurality of hardware interface devices 604 and 605. The processor 104 may include a host operating system 200, at least one guest operating system 300 and a hypervisor 400.

The virtualization system 14 may be substantially the same as the virtualization system 10 of FIG. 1, except that the virtualization system 14 includes the plurality of hardware input/output device 504 and 505 and the plurality of hardware interface devices 604 and 605.

The plurality of hardware input/output devices 504 and 505 may include a first hardware input/output device 504 and a second hardware input/output device 505. For example, each of the plurality of hardware input/output devices 504 and 505 may be implemented as described with reference to FIG. 3.

The plurality of hardware interface devices 604 and 605 may include a first hardware interface device 604 and a second hardware interface device 605. The first hardware interface device 604 may support a communication between the at least one guest operating system 300 and the first hardware input/output device 504. The second hardware interface device 605 may support a communication between the at least one guest operating system 300 and the second hardware input/output device 505. For example, each of the plurality of hardware interface devices 604 and 605 may be implemented as described with reference to FIGS. 7 and 8.

In some example embodiments, when the virtualized system 14 includes the plurality of hardware input/output devices 504 and 505, one hardware interface device may be formed and/or implemented for each hardware input/output device, and the least one guest operating system 300 may control a corresponding hardware input/output device using a corresponding hardware interface device. For example, when the at least one guest operating system 300 wants to control the first hardware input/output device 504, the first hardware input/output device 504 may be controlled using the first hardware interface device 604. For example, when the at least one guest operating system 300 wants to control the second hardware input/output device 505, the second hardware input/output device 505 may be controlled using the second hardware interface device 605.

For convenience of illustration, FIG. 11 illustrates only two hardware input/output devices 504 and 505 and two hardware interface devices 604 and 605. However, example embodiments are not limited thereto, and the number of hardware input/output devices and hardware interface devices may be variously determined according to example embodiments.

Although not illustrated in detail, the virtualized system according to example embodiments may be implemented by combining the examples of FIGS. 10 and 11.

Figure 12:
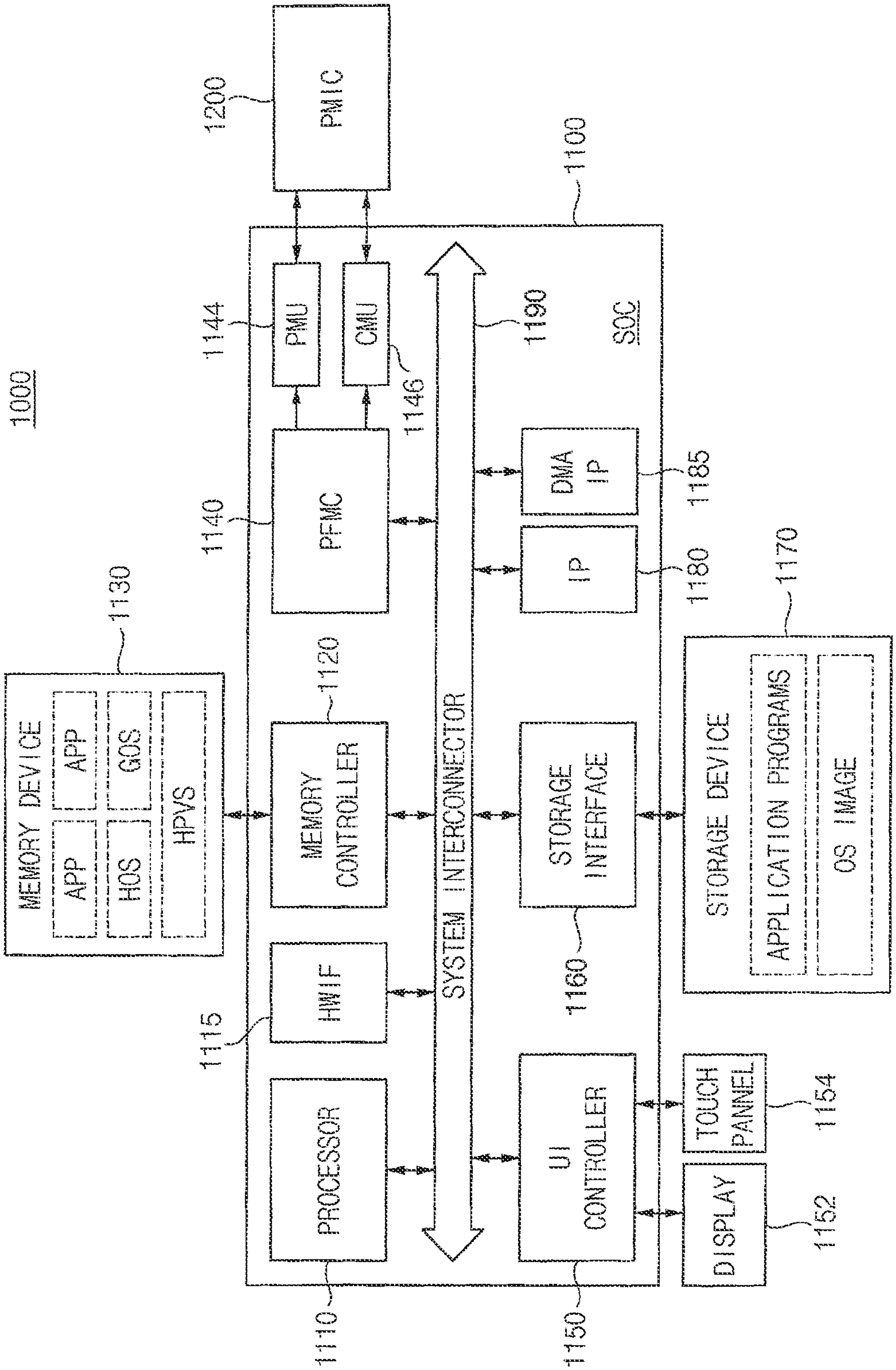
FIG. 12 is a block diagram illustrating a virtualized system according to an example embodiment.

FIG. 12 is a block diagram illustrating a virtualized system according to an example embodiment.

Referring to FIG. 12, a virtualized system 1000 may include a system-on-chip (SOC) 1100, a memory device 1130, a display device 1152, a touch panel 1154, a storage device 1170, a power management integrated circuit (PMIC) 1200, etc. The system-on-chip 1100 may include a processor 1110, a hardware interface device (HWIF) 1115, a memory controller 1120, a performance controller (PFMC) 1140, a user interface (UI) controller 1150, a storage interface 1160, one or more intellectual properties (IP) 1180, a direct memory access device (DMA IP) 1185 having a function of direct memory access (DMA), a power management unit (PMU) 1144, a clock management unit (CMU) 1146, etc. It will be understood that components of the virtualized system 1000 are not limited to the components illustrated in FIG. 12. For example, the virtualized system 1000 may further include a hardware codec for processing image data, a security block, and/or the like.

The processor 1110 may execute software (for example, an application program, an operating system (OS), and device drivers) for the virtualized system 1000. The processor 1110 may execute the operating system which may be loaded into the memory device 1130. The processor may be implemented by one of processors 100, 102, or 104. The processor 1110 may execute various application programs to be driven on the operating system. The processor 1110 may be provided as a homogeneous multi-core processor or a heterogeneous multi-core processor. A multi-core processor is a computing component including at least two independently drivable processors (hereinafter referred to as "cores" or "processor cores"). Each of the cores may independently read and execute program instructions.

The memory controller 1120 may provide interfacing between the memory device 1130 and the system-on-chip 1100. The memory controller 1120 may access the memory device 1130 according to a request from the processor 1110, the intellectual property 1180 and/or the direct memory access device 1185. For example, the memory device 1130 may be implemented as a DRAM, and then the memory controller 1120 may be referred to as a DRAM controller.

An operating system or basic application programs may be loaded into the memory device 1130 during a booting operation. For example, a hypervisor HPVS, a host operating system.

HOS and a guest operating system GOS stored in the storage device 1170 may be loaded into the memory device 1130 based on a booting sequence during booting of the virtualized system 1000. Thereafter, corresponding applications APPs may be loaded into the memory device 1130 by the host operating system HOS and the guest operating system GOS.

The hardware interface device 1115 may support a communication between the guest operating system GOS and a hardware input/output device. For example, the memory device 1130, the storage device 1170, the IP 1180 and the direct memory access device 1185 may correspond to the hardware input/output device.

The performance controller 1140 may adjust operation parameters of the system-on-chip 1100 according to a control request provided from a kernel of the operating system. For example, the performance controller 1140 may adjust a level of dynamic voltage and frequency scaling (DVFS) to enhance the performance of the system-on-chip 1100.

The user interface controller 1150 may control user input and output from user interface devices. For example, the user interface controller 1150 may display a keyboard screen for inputting data to the display device 1152 according to a control of the processor 1110. Alternatively, the user interface controller 1150 may control the display device 1152 to display data requested by a user. The user interface controller 1150 may decode data provided from user input means, such as the touch panel 1154, into user input data.

The storage interface 1160 may access the storage device 1170 according to a request from the processor 1110. For example, the storage interface 1160 may provide interfacing between the system-on-chip 1100 and the storage device 1170. For example, data processed by the processor 1110 may be stored in the storage device 1170 through the storage interface 1160. Alternatively, data stored in the storage device 1170 may be provided to the processor 1110 through the storage interface 1160.

The storage device 1170 may be provided as a storage medium of the virtualized system 1000. The storage device 1170 may store application programs, an operating system image, and various types of data. The storage device 170 may be provided as a memory card (e.g., MMC, eMMC, SD, MicroSD, etc.). The storage device 170 may include a NAND-type flash memory with high-capacity storage capability. Alternatively, the storage device 1170 may include a next-generation nonvolatile memory such as PRAM, MRAM, ReRAM, and FRAM or a NOR-type flash memory.

The direct memory access device 1185 may be provided as a separate intellectual property component to increase processing speed of a multimedia or multimedia data. For example, the direct memory access device 1185 may be provided as an intellectual property component to enhance processing performance of a text, audio, still images, animation, video, two-dimensional (2D) data or three-dimensional (3D) data.

A system interconnector 1190 may be a system bus to provide an on-chip network in the system-on-chip (SoC). The system interconnector 1190 may include, for example, a data bus, an address bus and a control bus. The data bus may be a data transfer path. A memory access path to the memory device 1130 or the storage device 1170 may also be provided. The address bus may provide an address exchange path between intellectual properties. The control bus may provide a path along which a control signal is transmitted between intellectual properties. However, a configuration of the system interconnector 1190 is not limited to the above description, and the system interconnector 190 may further include arbitration means for efficient management. In some example embodiments, the direct memory access device 1185 may have or perform a function of direct memory access to the memory device 1130. The direct memory access represents a scheme to transfer data directly from one memory device to another memory device or directly between a memory device and an input/output device without passing through the processor 1110, which may be supported by an internal bus of the virtualized system 1000. Modes of the direct memory access may include a burst mode in which the direct memory access device 1185 steals control of the internal bus from the processor 1110 to transfer data all at once, a cycle steal mode in which the direct memory access device 1185 accesses the memory device 1130 while the processor 1110 does not access the memory device 1130. The direct memory access may be performed without intervention of the processor 1110. Accordingly, performance of the virtualized system 1000 may be improved or enhanced because the processor 1110 may operate while the direct memory access is performed.

The virtualized system 1000 may further include a memory management circuit that manages a core access of the processor 1110 to the memory device 1130 and a direct access of the direct memory access device 1185 to the memory device 1130. The core access and the direct access may include a read operation to read data from the memory device 1130 and a write operation to store data to the memory device 1130. The core access may be performed based on a core access request issued by the processor 1110, and the direct access may be performed based on a direct access request issued by the direct memory access device 1185. For example, an operation of running the guest operating system GOS may be monitored, a target guest operating system controlling the direct memory access device 1185 may be rebooted based on a monitoring result of running the guest operating system GOS, and the memory management circuit may be controlled to block the direct access of the direct memory access device 1185 to the memory device 1130 based on a control of the hypervisor HPVS when the target guest operating system is rebooted.

Thus, the direct access may be rapidly blocked and a memory crash may be efficiently prevented by controlling the memory management circuit to provide temporal isolation of the direct memory access device 1185 when the target guest operating system controlling the direct memory access device 1185 is rebooted.

Figure 13:
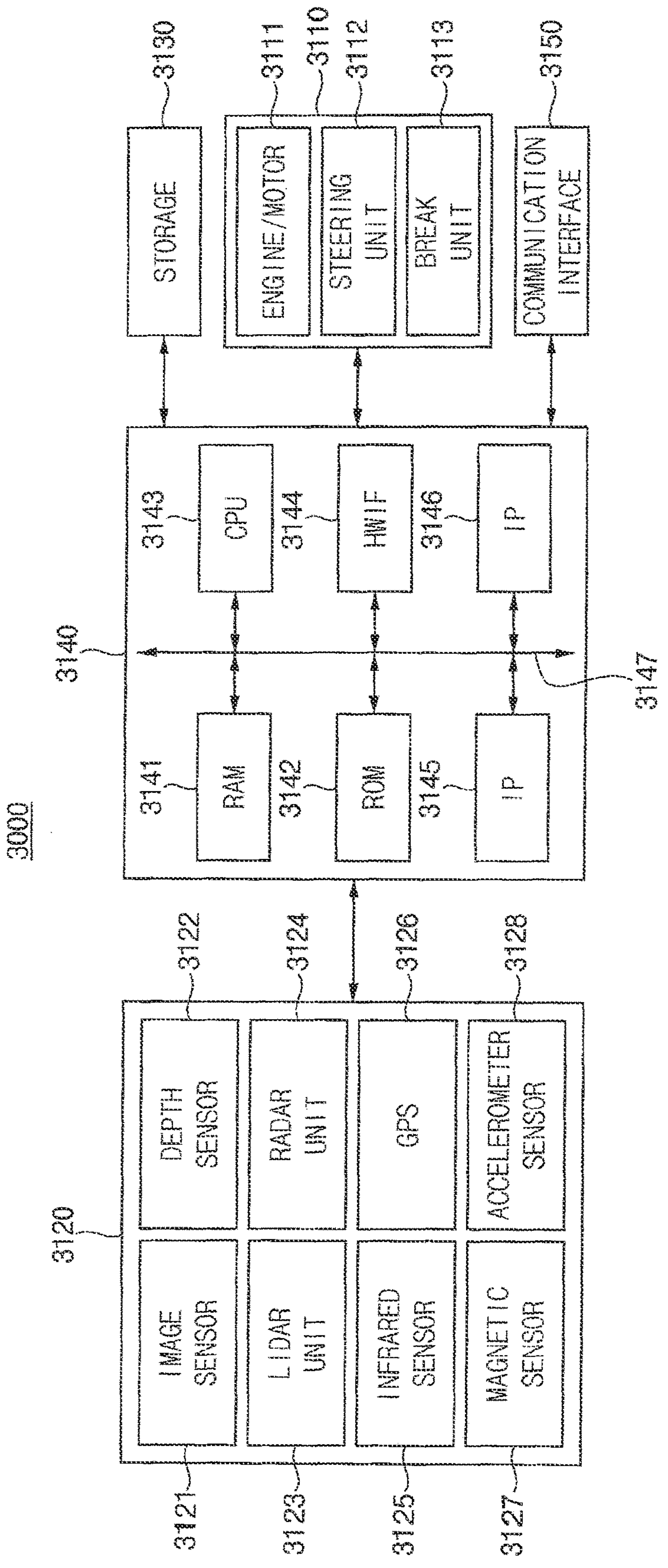
FIG. 13 is a block diagram illustrating an autonomous driving device including a virtualized system according to an example embodiment.

FIG. 13 is a block diagram illustrating an autonomous driving device including a virtualized system according to an example embodiment.

Referring to FIG. 13, an autonomous driving device 3000 may include a driver (e.g., including circuitry) 3110, a sensor 3120, a storage 3130, a controller (e.g., including processing circuitry) 3140 and a communication interface 3150.

The driver 3110 may, for example, be a configuration for driving the autonomous driving device 3000 and may include various circuitry. In a case that the autonomous driving device 3000 is implemented as a vehicle, the driver 3110 may include various circuitry and/or components, such as, for example, an engine/motor 3111, a steering unit 3112, a brake unit 3113, and the like.

The engine/motor 3111 may include any combination of an internal combustion engine, an electric motor, a steam locomotive, and a stirling engine. For example, in a case that the autonomous driving device 3000 is a gas-electric hybrid car, the engine/motor 3111 may be a gasoline engine and an electric motor. For example, the engine/motor 3111 may be configured to supply energy for the autonomous driving device 3000 to drive on a predetermined driving route.

The steering unit 3112 may be any combination of mechanisms included to control a direction of the autonomous driving device 3000. For example, when an obstacle is recognized while the autonomous driving device 3000 is driving, the steering unit 3112 may change the direction of the autonomous driving device 3000. In a case that the autonomous driving device 3000 is a vehicle, the steering unit 3112 may be configured to turn the steering wheel clockwise or counterclockwise, and change the direction of travel for the autonomous driving device 3000 accordingly.

The brake unit 3113 may be any combination of mechanisms included to decelerate the autonomous driving device 3000. For example, the brake unit 3113 may use friction or induction to reduce a speed of wheels/tires. When an obstacle is recognized while the autonomous driving device 3000 is driving, the brake unit 3113 may be configured to decelerate or slow the autonomous driving device 3000.

The driver 3110 may be a driver of the autonomous driving device 3000 driving or traveling on the ground, but example embodiments are not limited thereto. The driver 3110 may include a flight propulsion unit, a propeller, wings, etc., and may include a variety of vessel propulsion devices in accordance with various example embodiments.

The sensor 3120 may include a number of sensors configured to sense information relating to a surrounding environment of the autonomous driving device 3000. For example, the sensor 3120 may include at least one of an image sensor 3121, a depth camera 3122, a light detection and ranging (LIDAR) unit 3123, a radio detection and ranging (RADAR) unit 3124, an infrared sensor 3125, a global positioning system (GPS) 3126, a magnetic sensor 3127, and/or an accelerometer sensor 3128.

The image sensor 3121 may be configured to capture an image of or other data related to an external object located outside of the autonomous driving device 3000. The captured image or other data related to the external device may be used as data for changing at least one of a velocity and direction of the autonomous driving device 3000. The image sensor 3121 may include a sensor of various types, such as a charge coupled device (CCD) and a complementary metal oxide semiconductor (CMOS). In addition, the depth camera 3122 may acquire a depth for determining a distance between the autonomous driving device 3000 and an external object.

The LIDAR unit 3123, the RADAR unit 3124 and the infrared sensor 3125 may each include a sensor configured to output a particular signal and sense external objects in an environment in which the autonomous driving device 3000 is located. For example, the LIDAR unit 3123 may include a laser light source and/or laser scanner configured to radiate a laser, and a detector configured to detect reflection of the laser. The RADAR unit 3124 may be a sensor configured to sense objects in the environment in which the autonomous driving device 3000 is located, using a wireless signal. In addition, the RADAR unit 3124 may be configured to sense speeds and/or directions of the objects. The infrared sensor

3125 may be a sensor configured to sense external objects in an environment in which the autonomous driving device 3000 is located using a light of a wavelength of an infrared area.

The GPS 3126, the magnetic sensor 3127, and the accelerometer sensor 3128 may each include a sensor configured to acquire information relating to a velocity, direction, location, etc., of the autonomous driving device 3000. For example, information relating to a current state of the autonomous driving device 3000 may be acquired and a possibility of collision with an external object, etc., may be identified and/or estimated. The GPS 3126 may be configured to identify a location of the autonomous driving device 3000 as a latitude, longitude and altitude data through signals communicated with a satellite, and the magnetic sensor 3127 and the accelerometer sensor 3128 may be configured to identify the current state of the autonomous driving device 3000 according to momentum, acceleration and orientation of the autonomous driving device 3000.

The storage 3130 may be configured to store data necessary for the controller 3140 to execute various processing. For example, the storage 3130 may be realized as an internal memory such as a read-only memory (ROM), a random access memory (RAM) and the like included in the controller 3140, and may be realized as a separate memory from the controller 3140. In this case, the storage 3130 may be realized in the form of a memory embedded in the autonomous driving device 3000, or may be realized in the form of a memory that may be detachable from the autonomous driving device 3000 according to the usage of data storage. For example, data for driving the autonomous driving device 3000 is stored in a memory embedded in the autonomous driving device 3000, and data for an extension function of the autonomous driving device 3000 may be stored in a memory that may be detached from the autonomous driving device 3000. The memory embedded in the autonomous driving device 3000 may be realized in the form of a non-volatile memory, volatile memory, flash memory, hard disk drive (HDD), solid state drive (SDD), or the like, and the memory that may be detached from the autonomous driving device 3000 may be realized in the form of a memory card (e.g., micro SD card, universal serial bus (USB) memory), an external memory that is connectable to a USB port (e.g. USB memory), and the like.

The communication interface 3150 may include various communication circuitry and may be configured to facilitate communication between the autonomous driving device 3000 and an external device. For example, the communication interface 3150 may transmit and receive driving information of the autonomous driving device 3000 to and from the external device. For example, the communication interface 3150 may be configured to perform communication through various communication methods such as an Infrared (IR) communication, a Wireless Fidelity (WI-FI), Bluetooth, Zigbee, Beacon, near field communication (NFC), WAN, Ethernet, IEEE 1394, HDMI, USB, MHL, AES/EBU, Optical, Coaxial, and the like. In some example embodiments, the communication interface 3150 may be configured to communicate driving information through a server. For example, the communication interface 3150 may include a transceiver for performing wireless communication.

The controller 3140 may include a RAM 3141, a ROM 3142, a central processing unit (CPU) 3143, a hardware interface device (HWIF) 3144, a plurality of intellectual properties (IPs) 3145 and 3146, and a bus 3147. The RAM 3141, the ROM 3142, the CPU 143 and the hardware interface device 3144 may be connected to each other through the bus 3147, or at least two components may be directly connected through direct signal lines. The controller 3140 may be implemented as a system on chip (SOC).

The RAM 3141 may be a memory for reading, from the storage 3130, various instructions, etc., related to driving of the autonomous driving device 3000. The ROM 3142 may store a set of instructions for system booting. In response to a turn on command being input to the autonomous driving device 3000 and power being supplied, the CPU 3143 may copy an operating system stored in the storage 3130 into the RAM 3141 according to a command stored in the ROM 3142, and boot the system by executing the operating system. If booting is completed, the CPU 3143 performs various operations by copying various types of application programs stored in the storage 3130 into the RAM 3141 and executing the application programs copied into the RAM 3141. The controller 3140 may perform various operations using a module stored in the storage 3130.

According to an example embodiment, the CPU 3143 provides a virtualization environment including a hypervisor, a host operating system and a guest operating system. For example, the CPU 3143 may be implemented by one of processors 100, 102, or 104. The hardware interface device 3144 may support a communication between the guest operating system and a hardware input/output device (e.g., the IPs 3145 and 3146), and the guest operating system may control the hardware input/output device using the hardware interface device 3144. Accordingly, the guest operating system may communicate with the hardware input/output device without passing through complex software layers for implementing the virtualization, the performance of the hardware input/output device may be maintained and the performance degradation may be prevented, and the compatibility and portability of the software may be guaranteed or ensured.

Figure 14:
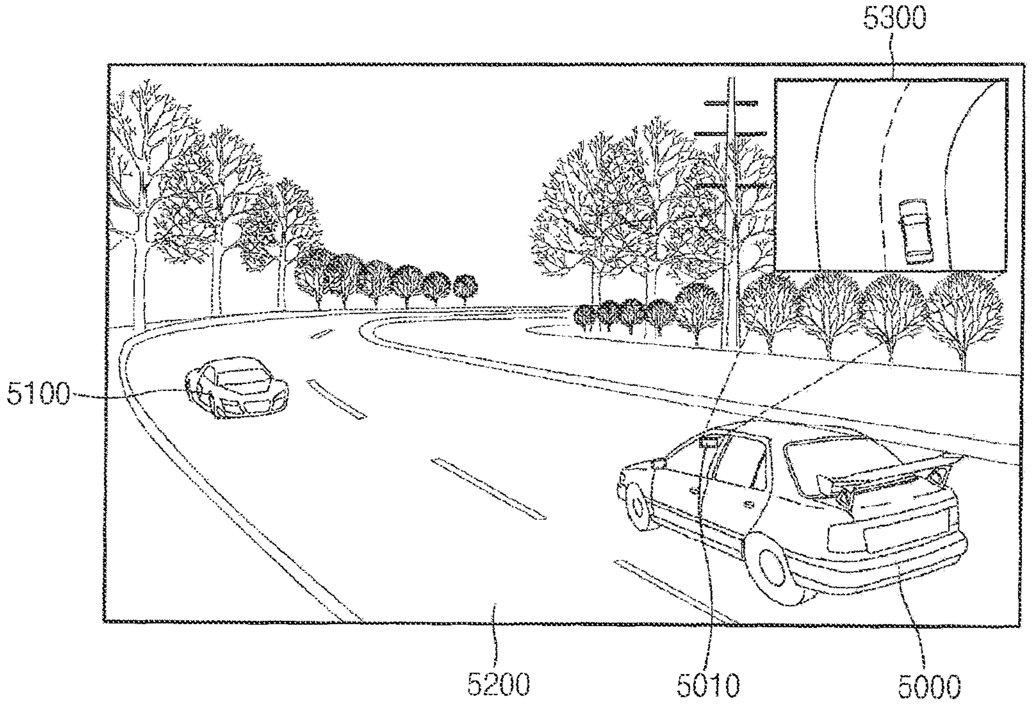
FIG. 14 is a diagram illustrating an example where a virtualized system according to an example embodiment is mounted on a vehicle.

FIG. 14 is a diagram illustrating an example where a virtualized system according to an example embodiment is mounted on a vehicle.

Referring to FIG. 14, a virtualized system 5010 may be an advanced driver assistance system (ADAS), an autonomous driving system, or the like, that is included in (e.g., mounted on) a vehicle 5000.

The virtualized system 5010 may include various circuitry and components configured to receive a video sequence including a stereo image, reflected waves (e.g., reflected electromagnetic waves), or reflected lights from a camera mounted in the vehicle 5000 and determine an occurrence of various events associated with the vehicle 5000. The various events may include object detection, object tracking and scene segmentation. The virtualized system 5010 may generate an output signal that includes a notification message that may be presented to an occupant (e.g., user) of the vehicle 5000, via one or more user interfaces of the vehicle 5000, based on a determined occurrence of one or more events. The virtualized system 5010 may generate an output signal that causes a vehicle control system of the vehicle 5000 to control one or more driving elements of the vehicle 5000 to control the driving (e.g., driving trajectory) of the vehicle 5000, based on a determined occurrence of one or more events.

For example, the virtualized system 5010 may detect a road 5200 including a fixed pattern and another vehicle 5100 moving according to time, by analyzing the at least one video sequence 5300. For example, the virtualized system 5010 may determine occurrence of an event based on detection of the other vehicle 5100, by analyzing a location of the other vehicle 5100 by analyzing a coordinate of the other vehicle 5100 in the at least one video sequence 5300. The virtualized system 5010 may further, based on the determination, generate an output signal that, when processed by a control system of the vehicle 5000, causes a particular notification message to be presented to an occupant of the vehicle 5000 via a user interface of the vehicle 5000 and/or causes driving of the vehicle 5000 to be controlled to cause the vehicle 5000 to be driven along a particular driving path (e.g., driving trajectory) through the surrounding environment (e.g., autonomous driving, driving the vehicle 5000 as an autonomous vehicle, etc.).

In some example embodiments, the vehicle 5000 may include any means of transportation, such as, for example, and without limitation, an automobile, a bus, a truck, a train, a bicycle, a motorcycle, or the like, providing a communication function, a data processing function, and/or a transportation function.

Embodiments of the inventive concept may be used on various vehicles even though the vehicles are implemented with different types of hardwares. This use of virtualization may reduce the cost of providing software upgrades and maintenance for a long period of time on vehicles used for a long time. Even if a performance degradation occurs, when a virtualized system according to an example embodiment is applied or employed, the compatibility and portability of the software may be guaranteed without the performance degradation, and devices that are not supported by the host operating system may be run on the guest operating system.

As will be appreciated by those skilled in the art, the inventive concept may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

Embodiments of the inventive concept may be applied to various electronic devices and systems to which the virtualization environment is applied or employed. For example, embodiments of the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, an automotive, etc.

The foregoing is illustrative of example embodiments and is not to be construed as limiting thereof. Although some example embodiments have been described, those skilled in the art will readily appreciate that many modifications are possible in the example embodiments without materially departing from the example embodiments. Accordingly, all such modifications are intended to be included within the scope of the example embodiments as defined in the claims.

What is claimed is:

1. A virtualized system comprising:

a processor configured to provide a function for a virtualization environment;

a host operating system (OS) configured to run on the virtualization environment;

at least one guest operating system configured to run on at least one virtual machine of the virtualization environment;

a hypervisor configured to implement the virtualization environment using the function of the processor, and configured to generate and control the at least one virtual machine of the virtualization environment;

at least one hardware input/output (I/O) device controlled by the host operating system and the at least one guest operating system; and at least one hardware interface device configured to support direct communication between the at least one guest operating system and the at least one hardware input/output device in accordance with VIRTIO specification, and to enable the at least one guest operating system to control the at least one hardware input/output device, wherein the at least one hardware interface device comprises a physical hardware device for communicating with the at least one hardware I/O device, wherein the at least one guest operating system comprises a guest virtualization driver for performing an operation of the virtualization environment, wherein the at least one virtual machine of the virtualization environment comprises at least one virtualized hardware I/O device corresponding to the at least one hardware I/O device, and wherein the at least one hardware input/output device and the at least one virtualized hardware I/O device are controlled by the at least one guest operating system through the guest virtualization driver using a same driver interface.

2. The virtualized system of claim 1, wherein the at least one hardware interface device operates independently from the at least one guest operating system and the hypervisor.

3. The virtualized system of claim 2, wherein the at least one hardware input/output device is controlled through the guest virtualization driver and the at least one hardware interface device.

4. The virtualized system of claim 3, wherein the guest virtualization driver provides an interrupt directly to the at least one hardware interface device without being trapped by the hypervisor to control the at least one hardware input/output device.

5. The virtualized system of claim 4, wherein the guest virtualization driver provides the interrupt to the hypervisor and the hypervisor forwards the interrupt to the at least one hardware interface device without the hypervisor performing an operation on the interrupt.

6. The virtualized system of claim 3, further comprising:

a shared memory shared by the host operating system and the at least one guest operating system, and wherein the at least one guest operating system is configured to exchange data with the at least one hardware input/output device through the guest virtualization driver and the shared memory.

7. The virtualized system of claim 1, wherein the at least one hardware interface device comprises:

at least one hardware emulator included in the hypervisor.

8. The virtualized system of claim 1, wherein:

the at least one guest operating system includes a first guest operating system configured to run on a first virtual machine of the virtualization environment, the at least one hardware input/output device includes a first hardware input/output device, and the at least one hardware interface device includes a first hardware interface device configured to support communication between the first guest operating system and the first hardware input/output device.

9. The virtualized system of claim 8, wherein:

the at least one guest operating system further includes a second guest operating system configured to run on a second virtual machine of the virtualization environment and configured to operate independently from the first guest operating system, and the at least one hardware interface device further includes a second hardware interface device configured to support communication between the second guest operating system and the first hardware input/output device.

10. The virtualized system of claim 8, wherein:

the at least one hardware input/output device further includes a second hardware input/output device different from the first hardware input/output device, and the at least one hardware interface device further includes a second hardware interface device configured to support communication between the first guest operating system and the second hardware input/output device.

11. The virtualized system of claim 1, wherein the host operating system comprises:

a host virtualization driver for performing an operation of the virtualization environment; and a device driver configured to directly control the at least one hardware input/output device, and wherein the at least one hardware input/output device is controlled through the host virtualization driver and the device driver without using the at least one hardware interface device.

12. The virtualized system of claim 1, further comprising:

a memory device into which the host operating system, the at least one guest operating system and the hypervisor are loaded.

13. The virtualized system of claim 12, further comprising:

a storage device configured to store the host operating system, the at least one guest operating system and the hypervisor.

14. The virtualized system of claim 13, wherein, in response to the virtualized system being booted, the host operating system, the at least one guest operating system and the hypervisor that are stored in the storage device are loaded into the memory device.

15. The virtualized system of claim 1, wherein the at least one hardware input/output device includes at least one of a memory device, a camera, a graphics processing unit (GPU), a neural processing unit (NPU), a peripheral component interconnect express (PCIe) device and a universal flash storage (UFS) device.

16. The virtualized system of claim 1, wherein the at least one hardware interface device is physically separated from the at least one guest operating system and the at least one hardware input/output device, and wherein the at least one hardware input/output device comprises a physical hardware device physically separated from the at least one hardware interface device.

17. The virtualized system of claim 1, wherein a data flow and a control flow among the host operating system, the at least one guest operating system, and the at least one hardware input/output device are separately configured.

18. A method of operating a virtualized system, the method comprising:

generating a virtualization environment, on which a host operating system (OS), at least one guest operating system and a hypervisor are executed using a processor, the processor configured to provide a function for the virtualization environment, the host operating system configured to run on the virtualization environment, the at least one guest operating system configured to run on at least one virtual machine of the virtualization environment, the hypervisor configured to implement the virtualization environment using the function of the processor and configured to generate and control the at least one virtual machine of the virtualization environment; and when at least one hardware input/output (I/O) device is to be controlled by the at least one guest operating system, controlling the at least one hardware input/output device using at least one hardware interface device, the at least one hardware input/output device being controlled by the host operating system and the at least one guest operating system, the at least one hardware interface device configured to support direct communication between the at least one guest operating system and the at least one hardware input/output device in accordance with VIRTIO specification, wherein the at least one guest operating system comprises a guest virtualization driver for performing an operation of the virtualization environment, wherein the at least one virtual machine of the virtualization environment comprises at least one virtualized hardware I/O device corresponding to the at least one hardware I/O device, and wherein the at least one hardware I/O device and the at least one virtualized hardware I/O device are controlled by the at least one guest operating system through the guest virtualization driver using a same driver interface.

19. The method of claim 18, further comprising:

when the at least one hardware input/output device is to be controlled by the host operating system, controlling the at least one hardware input/output device without using the at least one hardware interface device.

20. A virtualized system comprising:

a processor configured to provide a function for a virtualization environment;

a host operating system (OS) configured to run on a host virtual machine of the virtualization environment;

a first guest operating system and a second guest operating system configured to run independently from each other on a first guest virtual machine and a second guest virtual machine of the virtualization environment, respectively, and configured to run independently from the host operating system, the first guest virtual machine and the second guest virtual machine being different from each other;

a hypervisor configured to implement the virtualization environment using the function of the processor, and configured to generate and control the host virtual machine, the first guest virtual machine and the second guest virtual machine of the virtualization environment;

a hardware input/output (I/O) device controlled by the host operating system, the first guest operating system and the second guest operating system;

a first hardware interface device configured to support direct communication between the first guest operating system and the hardware input/output device in accordance with VIRTIO specification; and a second hardware interface device configured to support direct communication between the second guest operating system and the hardware input/output device in accordance with VIRTIO specification, the second hardware interface device being different from the first hardware interface device, wherein at least one of the first and second hardware interface devices comprises a physical hardware device for communicating with the hardware I/O device, wherein the first guest operating system comprises a first guest virtualization driver for performing an operation of the virtualization environment, wherein the hardware input/output device is controlled through the first guest virtualization driver and the first hardware interface device, wherein the second guest operating system comprises a second guest virtualization driver for performing an operation of the virtualization environment, wherein the hardware input/output device is controlled through the second guest virtualization driver and the second hardware interface device, wherein the host operating system comprises:

a host virtualization driver for performing an operation of the virtualization environment; and a device driver configured to directly control the hardware input/output device, wherein the hardware input/output device is controlled through the host virtualization driver and the device driver without using the first hardware interface device or the second hardware interface device, wherein the first guest operating system comprises a guest virtualization driver for performing an operation of the virtualization environment, wherein the first guest virtual machine of the virtualization environment comprises at least one virtualized hardware I/O device corresponding to the hardware I/O device, and wherein the hardware input/output device and the at least one virtualized hardware I/O device are controlled by the first guest operating system through the guest virtualization driver using a same driver interface.

* * * * *